United States Patent [19]

Horwitz et al.

[11] Patent Number: 5,774,866
[45] Date of Patent: Jun. 30, 1998

[54] COMPUTERIZED PROBLEM CHECKING SYSTEM FOR ORGANIZATIONS

[75] Inventors: Lois Horwitz, Springfield; William J. Heller, Wyckoff; Denise Mariano, Landing; Todd M. Sahner, Middletown, all of N.J.; John Price, Glenshaw, Pa.

[73] Assignee: Hannoch Weisman, Roseland, N.J.

[21] Appl. No.: 534,011

[22] Filed: Sep. 26, 1995

[51] Int. Cl.$^6$ .................................................. G06F 17/60
[52] U.S. Cl. ......................................... 705/7; 705/9
[58] Field of Search ............................... 395/207; 705/7, 705/8, 9

[56] References Cited

U.S. PATENT DOCUMENTS

| | | |
|---|---|---|
| 3,952,184 | 4/1976 | Bassard . |
| 4,122,523 | 10/1978 | Morse et al. . |
| 4,799,156 | 1/1989 | Shavit et al. . |
| 4,896,269 | 1/1990 | Tong . |
| 5,006,985 | 4/1991 | Ehret et al. . |
| 5,038,284 | 8/1991 | Kramer . |
| 5,239,617 | 8/1993 | Gardner et al. . |
| 5,257,185 | 10/1993 | Farley et al. . |
| 5,315,703 | 5/1994 | Matheny et al. . |
| 5,323,314 | 6/1994 | Baber et al. . |
| 5,333,302 | 7/1994 | Hensley et al. . |
| 5,349,662 | 9/1994 | Johnson et al. . |
| 5,377,355 | 12/1994 | Hager et al. . |

OTHER PUBLICATIONS

Pritchard–Schoch, Teresa; The Law librarian's first step to CIO: The conflicts database; Database; v16n6, pp. 105–108, Dec. 1993.

Brochure and other literature, Abacus Data Systems, Inc.
Brochure, Synaptec Software, Inc.
Literature, Barrister Information Systems Corporation, © 1992.
Literature, Computer Law Systems, 1994.
Brochure, DDI, Inc.
Brochure, InMagic Plus for Law Firms.
Literature, LegalEdge™, ©1993.
Literature, Legal IMS, Inc.
System Information Guide for Omega Legal Systems.
Literature, Orion Law Management System.

*Primary Examiner*—Robert A. Weinhardt
*Assistant Examiner*—William N. Hughet
*Attorney, Agent, or Firm*—Lerner, David, Littenberg, Krumholz & Mentlik

[57] ABSTRACT

A computer system for checks for conflicts associated with proposed new matters in an organization which deals with numerous clients. The system compares data concerning potential relationships of a party to the organization with data denoting existing relationships and identifies potential problem situations where the client in a potential matter is the same as the client in an existing matter. For at least some of these matches, the system uses stored data defining associations between existing parties and persons within the organization to select one or more persons within the organization associated with the existing party, and sends a signal denoting the potential problem to one or more of the persons. The potential problem signal is selectively routed to only those persons concerned. These persons can signal the system that the problem does not exist, or that the problem has been resolved. The system can resolve potential conflicts rapidly while still providing thorough review.

28 Claims, 8 Drawing Sheets

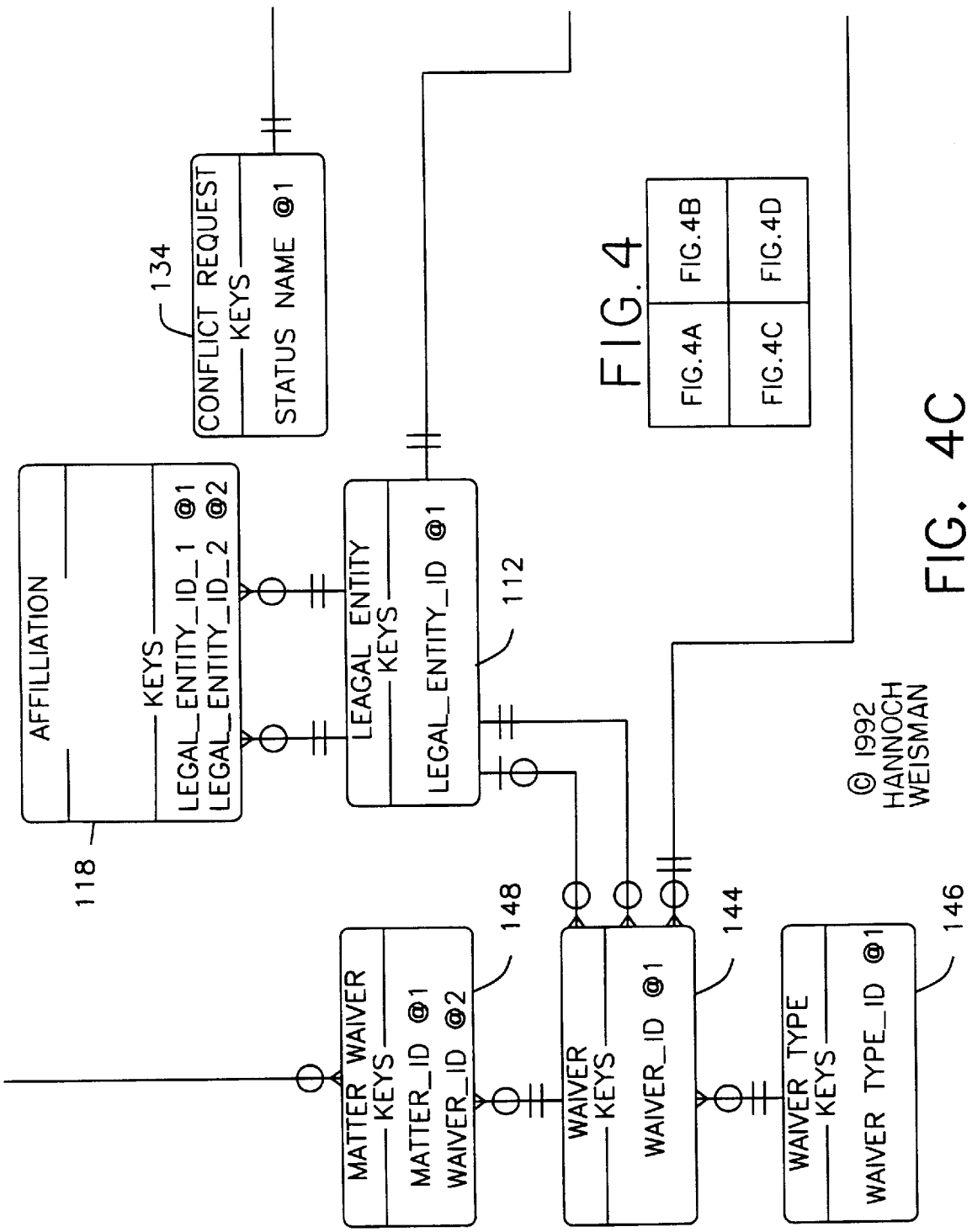

COMPUTERIZED PROBLEM CHECKING SYSTEM FOR ORGANIZATIONS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to computer systems, methods and programming elements adapted for use in organizational administration.

BACKGROUND OF THE INVENTION

Organizations with large numbers of individuals dealing with parties outside of the organization can encounter serious difficulties in coordination of the individual efforts. For example, professional service firms such as law firms must avoid conflicts of interest. A law firm normally cannot properly represent a first party against a second party if the second party is already a client of the firm. A law firm normally cannot represent one party in negotiations with another party if the other party is a client of the firm, unless both parties waive the potential conflict. Numerous other situations can also give rise to conflicts.

Some law firms seek to avoid conflicts by circulating memoranda or lists of potential new matters to all of their attorneys, so that each attorney can review all incoming clients and/or matters and voice an objection if he or she spots a potential conflict. However, if the one attorney who might spot the potential conflict is absent when the memorandum is circulated, the conflict will go unnoticed. It is ordinarily impractical to delay the acceptance of a new matter until after all attorneys have seen the circulated memorandum. Many law firms utilize computerized systems for the initial stages of a conflict checking process. Aspects of such systems are described in the Conflict Of Interest Systems Conversion Manual published by Attorney's Liability Assurance Society, Inc. (1991). As described therein, such systems store identifications of clients of the firm, their affiliates, owners and other parties related to the firm, and also store corresponding information for adversaries and other parties involved in matters handled by the firm. Information about a prospective new client and/or adversary is entered and compared with information already stored in the system. A report listing the potential conflicts is furnished to an individual or committee and that person makes a professional determination as to whether or not a true conflict exists. For example, if the computerized comparison of data shows that the corporate name of a potential defendant in a suit to be initiated on behalf of a prospective client is the same as the corporate name of an existing client, the attorney reviewing the situation may find that, in fact, the two corporations are different and unrelated and that there is no conflict. In other matters, the attorney reviewing the conflict may be able to obtain a waiver of the conflict from the existing client and from the potential new client. The attorney reviewing the conflicts may consult with other attorneys in the firm, including the attorney responsible for conducting business with the existing client involved in the potential conflict. After the potential conflict is resolved, the attorney responsible for accepting or opening the new matter, and the firm's file department are advised, and they can then proceed to open the new matter as a case being handled by the firm.

Effective conflict screening with such a system is inherently slow and cumbersome. In a large firm with many attorneys opening new matters, many potential conflicts will be identified each day. For each potential conflict, clerical personnel must consult the appropriate records and file and circulate information concerning the potential conflict to the appropriate attorneys. The clerical personnel normally circulate sign-off sheets to various attorneys to secure approval for accepting or opening the new matter. Hours or days can elapse between the initial inquiry with regard to a possible new matter and receipt of clearance to open the matter and commence work. If one or more of the attorneys or clerks involved in the process is absent or otherwise occupied, the clearing process will come to a halt. The attorney who initiated the potential new matter normally has no way to determine where his or her matter is in the system, and has no convenient way to expedite clearance if the matter is especially urgent. This leads to considerable loss of time as the initiating attorney attempts to find the point in the process where his or her matter is being delayed, as by telephoning all of the people potentially involved in the conflict clearing process.

All of these problems become even more serious as the size of the firm, and the complexity of its business increase. These problems are further magnified in firms having multiple offices.

Similar problems occur in professional organizations other than law firms, as, for example, accounting and advertising organizations. Although considerable time and effort has been devoted in the prior art heretofore to development of conflict checking systems, there has remained a substantial, unmet need for a conflict checking system which allows comprehensive, rapid resolution of potential conflicts in professional and business organizations. There has been a particular need for systems which will reliably find and check potential conflicts, and which will do so promptly.

These problems and needs have been further aggravated by the need to take account of complex relationships between existing or proposed clients and others. For example, where the client in the proposed matter is a corporate subsidiary of a parent which, in turn, has other subsidiaries and affiliates, it is important to screen for conflicts between existing clients and the parents and affiliates of the parent of the proposed client. Other proposed clients may be partnerships in which the individual partners should be treated as affiliates for conflict screening purposes. In other situations, individuals and other legal entities who do not have a direct ownership relationship with the proposed client should be treated as affiliates for conflict screening purposes as, for example, the officers and directors of a client, their spouses and close relatives. Present systems generally do not provide a way to assure that all of the information concerning affiliates or others who should be considered as affiliates is entered into the system. Thus, there has been a substantial need for computerized conflict checking systems which can deal effectively with complex affiliate relationships.

There are similar needs for improvements in systems designed to check for potential problems in relationships other than conflicts of interest. For example, a large sales organization having numerous sales representatives may wish to avoid overlap between the efforts of its various representatives as, for example, where a first representative is dealing with the headquarters purchasing department of a large corporation and a second representative approaches a local affiliate of the same corporation. Although there is no conflict of interest, as both sales representatives are trying to sell on behalf of the same organization, an embarrassing situation could occur if the second representative quotes different prices than the first. Other situations which require coordination between multiple individuals in dealing with parties outside of the organization, referred to herein as "relationship problems", can occur in other organizational structures. Thus, there have been additional needs for systems which will check and clear relationship problems other than conflicts.

There have been corresponding needs for methods of operating computer systems to check and clear relationship problems, including conflicts, and for programming elements which will actuate computer systems to perform such methods.

SUMMARY OF THE INVENTION

One aspect of the present invention provides methods of operating a computer system to check relationship problems in an organization including a plurality of persons. Preferred methods according to this aspect of the invention include the steps of providing computer intelligible existing relationship data denoting one or more existing parties having existing relationships to the organization, and also denoting an association between each such existing party and one or more persons within the organization. For example, in a law firm the association data may denote one or more attorneys as responsible for the matters being handled on behalf of each existing client. The method according to this aspect of the invention further includes the step of providing computer intelligible proposed relationship data denoting one or more proposed matters and also denoting one or more proposed parties associated with each proposed matter. The method further includes the step of actuating the computer system to compare the proposed relationship data and the existing relationship data and to identify a potential matter as having a match when a proposed party associated with a proposed matter matches an existing party. Preferably, the step of identifying existing and proposed parties as matching one another is performed so that the existing and proposed parties need not be an exact match. That is, the existing and proposed parties are treated as matching one another if data designating the proposed party and data designating the existing party correspond to one another to at least a preselected degree of correspondence. For example, parties may be treated as matching one another if any word[s] in their corporate names match.

The method further includes the step of performing a problem signaling routine for at least some of the identified matches within the computer system. The problem signaling routine includes the step of setting a potential problem status in the computer system for the proposed matter having the match and, using the person association data provided in the existing relationship data, automatically selecting one or more persons associated with each existing party included in the match, as evaluators for the potential problem status. Preferably, the step of performing a problem signaling routine also includes the step of automatically sending a potential problem signal incorporating information about the match to the evaluator. The system further receives problem clearance signals sent by the evaluators and automatically clears potential problem status responsive to the problem clearing signals.

Most preferably, the computer system is connected to a data transmission network, and at least some of the persons in the organization have terminals connected to the network. The steps of sending the potential problem signals and receiving the problem clearance signals most preferably are performed at least in part by sending the potential problem signals and problem clearance signals through the network. Because the system uses the association data specifying persons involved with each existing party to select evaluators for a potential conflict, the system can bring each potential conflict directly to the attention of those who can resolve it. For example, in a law firm, the attorneys responsible for the affairs of an existing client can be informed of potential conflicts relating to that existing client. Most preferably, each person within the organization receives potential conflict signals relating only to those potential conflicts involving existing parties for whom such person is responsible. Stated another way, each person within the organization gets only those potential conflict signals of interest to him or her. Potential conflict signals which call for immediate action by the individual are presented clearly, without a mass of extraneous information.

Desirably, the system is arranged to set a clear status with respect to each potential matter either promptly after the comparing step or after the step of performing a problem signaling routine if no problem status has been set with respect to the proposed matter or, if one or more potential problem statuses have been set for the proposed matter, promptly after clearance of the last remaining potential problem status for that proposed matter. The method desirably also includes the step of setting a denied status for a proposed matter in response to receipt of clearance denial signals from a preselected set of evaluators for each potential problem status associated with the matter. Desirably, a requesting person within the organization associated with each proposed matter supplies the proposed matter data through the computer network, and the method further includes the step of automatically providing an indication of each clear status and each denied status accessible through the network. Thus, the requesting person can check the status of the matter.

In a particularly preferred arrangement, the method further includes the step of automatically providing an indication of pending status accessible through the network for each proposed matter for which a potential problem status has been set but not yet cleared and for which no denied status has been set, and the indication of pending status includes an indication of the identity of the evaluator or evaluators for each potential problem status which has been set but not yet cleared. Thus, the requesting person within the organization can always determine where his or her matter is and the identities of all individuals who have not yet responded to potential problem signals requesting that they clear the matter. The requesting person can follow up with the appropriate individuals to expedite clearance or, if such individuals are unavailable, can seek clearance from their superiors within the organization.

Preferably, the existing relationship data and proposed relationship data include data defining one or more relationships of each existing party and data defining one or more relationships of each potential party, and the method further includes the step of pretesting each match found in the comparing step by applying one or more testing rules to yield either a potential problem result or a no potential problem result based upon the relationship data for the existing and proposed parties involved in the match. For example, the existing relationship data may include existing party relationship type data characterizing each existing party in one or more categories of existing relationship to the organization and the proposed relationship data may include similar data categorizing each proposed party in one or more categories of potential relationship to the organization. In a law firm, the relationship categories may include parties represented by the firm; non client parties also involved in a litigation; parties whose interests are adverse to those represented by the firm in a litigation; affiliates of an adverse party and the like. If a particular corporation is a client of the firm in an existing matter, then there would be a potential conflict if the same corporation appeared as a possible adverse party in a proposed matter. However, if the same party appears as a potential client in a proposed matter, then there would be no potential conflict and no need to set the potential problem signal.

When the system is processing a plurality of proposed matters simultaneously, the system may also search for potential conflicts between proposed matters, and process these in the same way as potential conflicts between a proposed matter and an existing matter.

In a particularly preferred arrangement, the step of providing the proposed relationship data includes the steps of entering data representing policy attributes for each proposed relationship. Policy attributes, as used in this disclosure, refer to attributes of a proposed matter that are not specific to relationships of particular parties to the firm. For example, in a law firm policy attributes may pertain to the field of law involved to the type of client involved or to the credit worthiness of the client. Policy attributes may include factors pertaining to the past credit experience with the client as, for example, any existing unpaid bills for prior work done by the firm. The method further includes the step of automatically actuating the computer system to present data presenting the policy attributes pertaining to each potential matter to a predetermined set of policy attribute evaluators; receiving policy attribute clearance signals from the attribute evaluators and inhibiting the matter opening routine or the clear signal until the policy attribute clearance signals have been received from at least a preselected set of the attribute evaluators. Thus, in addition to clearing any potential problems or conflicts due to the identities of the parties, the system also clears each new matter from a policy point of view.

A further aspect of the invention includes methods of operating a computer system to check and clear relationship problems in an organization including a plurality of persons, the methods including the steps of providing computer intelligible existing relationship data denoting one or more existing parties having existing relationships to the organization; providing computer intelligible proposed relationship data denoting one or more proposed matters and one or more proposed parties associated with each such proposed matter and actuating the system to compare the proposed and existing data and to identify matters as having a match when a proposed party associated with a proposed matter matches an existing party. These steps of this method may be performed as part of the method according to the first aspect of the invention discussed above. The method according to this aspect of the invention further includes the step of providing party type data in the computer system defining a plurality of party types and a set of affiliation types for at least some of the party types. In the method according to this aspect of the present invention, the step of providing the proposed relationship data includes the steps of entering a party type to the computer system for each party associated with the proposed matter and, if a set of affiliation types is defined for such party type, automatically displaying queries requesting the identities of affiliates in each type included in the set. For example, the party types may include "corporation"; "a general partnership", "individual" and the like. The set of affiliation types for a corporation would include subsidiaries of the corporation; individuals or corporations owning stock in the corporation; members of the corporation board; and officers. After entering the name of the original corporation and the fact that it is a corporation, the person entering the data is prompted to enter the names of the subsidiaries; the names of the shareholders; the names of the officers and directors and so on. The requesting person entering the data is guided through input of all affiliates which may appear for a given type of party.

Yet another aspect of the invention includes a programming element for a computer system including a data storage medium such as a floppy disk, hard disk or tape and date encoded on the data storage medium for actuating a computer system to perform methods discussed above.

Yet a further aspect of the invention provides a computer system for checking and clearing relationship problems in an organization including a plurality of persons at a plurality of locations. The system according to this aspect of the invention includes a plurality of terminals disposed at least some of the locations; a data communications network connected to the terminals and existing relationship memory means for storing computer intelligible relationship data denoting one or more existing parties having existing relationships to the organization and also denoting an association between each existing party and one or more persons within the organization. The apparatus further includes proposed relationship memory means for storing computer intelligible proposed relationship data denoting one or more proposed matters and one or more proposed parties associated with each such proposed matter. The existing relationship and proposed relationship memory means may include parts of general purpose random access memory devices such as DRAM together with mass storage memory devices such as optical or magnetic disk, drum or tape drives allocated to store existing or proposed relationship data.

The system according to this aspect of the invention desirably also includes a processor connected to the memory means for comparing the proposed relationship data and the existing relationship data and identifying a potential matter as having a match when a proposed party associated with a proposed matter. The processor is also adapted to perform a problem signaling routine for at least some of the matches including the steps of setting a potential problem status for a potential matter having a match; using the person association data stored in the existing relationship memory means to select one or more persons associated with each existing party including the match as evaluators for the potential problem status; and automatically sending a potential problem signaling incorporating information about the potential problem status through the data communication network and terminals to such evaluators. Preferably, the system includes address storage means for storing an address on the data communications network for each person within the organization and the processor actuates the data communications network to deliver each potential problem signal to the address on the network associated with the persons selected as evaluators for the particular potential problem signal. Desirably, the system further includes means for displaying an audio or video signal at a terminal associated with the network to indicate the arrival of a potential problem signal. In its preferred arrangement, the system provides for fully interactive, on-line handling of potential conflicts.

These and other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 4a–4d constitute a functional block diagram depicting a data structure utilized in the apparatus and methods of FIGS. 1–3.

DETAILED DESCRIPTION OF THE PREFERRED EMBODIMENTS

Figure 1:
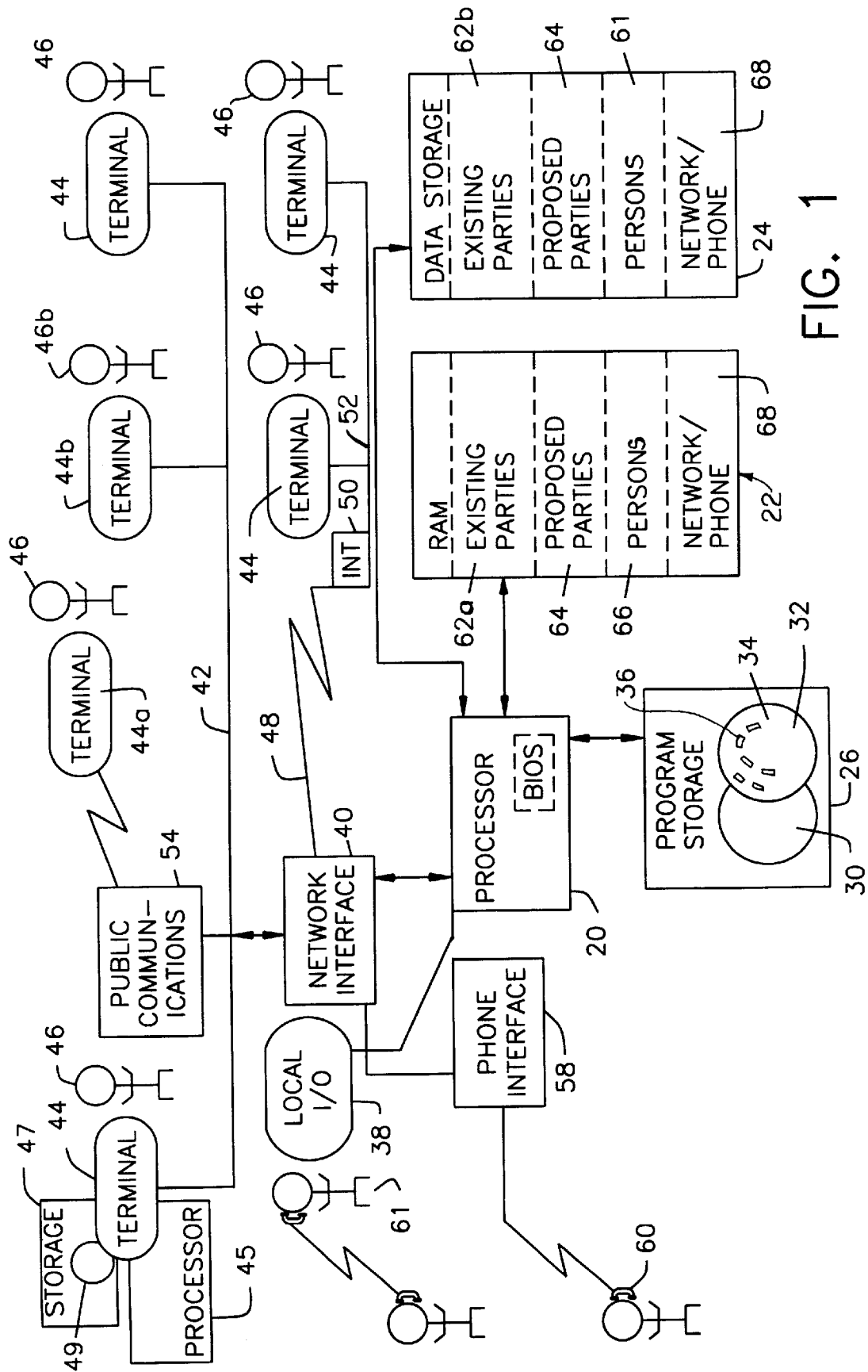
FIG. 1 is a functional block diagram depicting apparatus in accordance with one embodiment of the invention.

Apparatus in accordance with one embodiment of the present invention includes a central processing unit 20. Processor 20 may be a general purpose programmable digital computer of the type commonly utilized as a central or network server computer in a network environment. For example, so called "PC compatible" computers of the type having an Intel® Pentium® microprocessor and an EISA database structure may be utilized. Other conventional computing devices such as those commonly regarded as "mini computers", or "main frame" computers can also be employed as the central processing unit. A random access memory or "RAM" 22 is linked to the central processor through its internal database. RAM 22 typically consists of one or more semiconductor chips defining storage spaces for numerous digital words or "bytes" as, for example, 16 to 128 megabytes of information. The electrical interconnections within RAM 22 are organized in a conventional manner, so that each storage location is accessible by processor 20 for reading and writing information into or out of such location. The system further includes mass storage unit 24. The mass storage unit may incorporate one or more data storage devices such as magnetic disk drives, magnetic tape drives, optical or magneto-optical disk drives and solid state memory chips such as "flash" memory. Each of these units may be of a conventional type, compatible with processor 20. Each of the elements of storage unit 24 has physical location within which data can be stored and read as, for example, the individual portions of the magnetic layer on a magnetic disk, or the optically sensitive layers on an optical disk. This unit incorporates conventional mechanisms for finding requested physical locations on the data storage medium and reading the data therefrom. Preferably, at least some of the units included in program storage unit 24 are also capable of finding particular physical locations on the data storage medium and writing new data into such new locations. The systems further includes a program storage unit 26. Program storage unit 26 incorporates a similar arrangement of one or more conventional mass storage devices such as disk drive or tape drive adapted to read data from programming elements such as disks 30 and 32. An operating system disk 30 has stored thereon an operating system program such as UNIX the disk operating system or DOS; or the Windows NT® operating system, the latter being available from Microsoft Corporation. Where the operating system does not itself include a graphical user interface, operating system disk 30 may also include a separate graphical interface program such as Windows 3.1® or Windows For Workgroups®. In the conventional manner, processor 20 typically is arranged to actuate program storage unit 26 to automatically read certain information, constituting a control portion of the operating system; from operating system disk 30 during start-up or "boot". The control portion loaded during the boot cycle than controls program storage unit 26 to supply other portions of the operating system program as required. The operating system program acts as an interpreter between applications programs and the basic internal operating system for "BIOS" of processor 20. In conjunction with the BIOS, the operating system program actuates processor 20 to control the physical operations of program storage unit 26, RAM 22 and data storage 24. For example, where an applications program calls for a "file" or mass of information to be stored, the operating system and BIOS cooperatively select physical locations in RAM 22 and/or in mass storage unit 24 and assign the data to those physical locations. When the applications program calls for particular data in the file, the operating system and BIOS cooperatively locate the appropriate physical locations having the requested data and cause such data to be read from RAM 22. The operating system and BIOS cooperatively maintain an association between physical locations within data storage unit 24 and file name and locations or other logical designators supplied by an applications program. The operating system and BIOS also control physical interactions between the processor 20 and input and output devices such as those discussed below.

A further programming element or disk 32 includes data defining an application program for actuating the system to perform the steps discussed below. Disk 32 incorporates a data storage medium, such as the physical disk itself 34 together with physical elements 36 including the applications program itself. The nature of the physical elements will depend upon the nature of the disk or other medium. For example, where disk 32 is a magnetic disk, the physical element 36 may include magnetic domains aligned in particular directions, whereas if storage medium 34 is an optical disk, the physical elements including the program will incorporate optically marked spots. Storage medium 34 may also include devices such as ROM or Read Only Memory; PROM or Programmable Read Only Memory; FLASH memory or other solid state memory elements. Although applications program element 32 is illustrated as separate from operating systems program element 30, the two program elements can include portions of a single, large data storage medium. Also, although program storage unit 26 and data storage unit 24 are symbolized as separate physical elements, these also can be integrated with one another in a common physical structure. For example, in a system having a conventional hard disk drive, the functions of program storage unit 26 and data storage unit 24 can be integrated in a single hard disk drive, and the functions of operating systems data storage element 30, application program element 34 can be performed by parts of the disk of such hard disk drive.

The system further includes local input and output devices 38, such as one or more conventional keyboards, video displays and printers linked directly to processor 20. A network interface 40 is also connected to the processor. Network interface 40 is connected by a dedicated LAN communications channel 42 to a plurality of terminals 44 disposed of distributed locations throughout the office of the firm. Communications channel 42 typically includes wiring such as twisted pair wire or coaxial cable, fiber optic links or local free space communications of the type commonly used to connect data terminals with network servers in an office environment. The distributed locations at which terminals 44 are located may be the offices of individual attorneys 46 and/or secretaries to attorneys. Each terminal 44 desirably includes at least one data display device such as a video monitor or printer and at least one data entry device such as a keyboard, mouse, or touch screen data entry device. Each terminal 44 further includes a local processor 45 and a local storage unit 47 having therein a local program storage element 49. For clarity of illustration, these elements are depicted at only a few of the terminals in FIG. 1. These elements may be similar to the central processor 20 and the associated program storage unit 26. Each terminal 44 may be a conventional personal computer, with a personal computer operating system as discussed above stored therein. The local program storage element also stores portions of the program required to actuate the system as discussed below. As further discussed below, the local terminals act as client computers, whereas the central system, including central processor 20, acts as the server. Network interface 40 is also connected, via a wide area communications link 46 such as a dedicated telephone line, satellite link or by a public communications link 48 to one or more further network interfaces 50 at an offsite location as, for example, in offices in distant cities. Each interface 50 is in turn connected to a further local area network 52 to additional terminals 44 at further distributed locations in the distant city or cities. Network interface 40 is further connected to a public communications network 54 such as the public telephone system, including the wireless or cellular telephone systems connected thereto. Public communications network 54 may additionally or alternatively include a public packet switching network or a data transfer system using linked networks such as the Internet system. The network interface is arranged to actuate the public communications network to establish communications with one or more offline terminals 44a. Preferably, the network interface and any offline terminals used in the system incorporate encryption and decryption capabilities so that data sent over public communications networks is in encrypted form. Offline terminals 44a may be disposed at locations such as small offices or attorneys' homes and may also be portable units carried by attorneys such as portable computers with conventional or cellular modems. Each offline terminal 44a includes the same elements as terminals 44, together with appropriate equipment for connection to the public communications network, such as cellular or conventional modems.

Network interface 40 is also connected to a telephone interface unit 58. Unit 58 is adapted to convert data to voice by a speech synthesis process, and to convert voice to data by voice recognition. The phone interface unit may also be arranged to convert data to dual-tone, multi-frequency signals and to recognize incoming DTMF signals and convert the same to data. The phone interface unit is arranged to establish a connection to conventional telephones 60, each of which is equipped with a handset and a touch tone or key pad for generating DTMF signals.

Network interface 40 is shown only in block diagrammatic form. Thus, the network interface may include one or more communications server computers, modems and line interfaces as required. Also, although phone interface 58 is illustrated as linked to network interface 40, inasmuch as both elements establish external communication to processor 20, the phone interface may be physically connected directly to processor 20, without connection through any of the communication servers, modems or other elements of network interface 40. The operating system stored on operating system data storage element 30 desirably includes appropriate instructions for actuating the processor to control network interface 40 and phone interface 58. Alternatively, the system may have a separate program for controlling these elements. For example, the system may include a conventional network management program such as Novell Netware®. These elements serve to connect terminals 44 and 44a and telephones 60 in an integrated network for data communications. Thus, data can be passed between processor 20 and any one of the terminals 46 and 56, and can also be passed between processor 20 and telephone 60. In effect, each telephone 60 acts as an additional terminal on the network.

In a method according to one embodiment of the invention, the computer system is actuated by applications program element 32, and by portions of the local program storage elements 49 to perform a sequence of operations as discussed below. Processor 20 sets up storage addresses in RAM 22 and data storage unit 24 for existing party data, proposed party data; personnel data and network and phone system control data. The system thus subdivides the physical elements of RAM 22 and data storage unit 24 into an existing party storage data memory area 62; a proposed party data storage 64; a personnel data storage area 66 and a network and telephone/address data storage area 68. The existing party data storage area 62 includes a portion 62a of RAM 22 and a portion 62b of data storage unit 24. Each of areas 64, 66 and 68 also includes a portion of the RAM and a portion of data storage unit 24. In the conventional manner, processor 20, under the control of the operating system and BIOS transfers data between RAM and data storage. The physical boundaries of areas 62, 64, 66 and 68 typically change during operation of the program. Thus, the system will move data from physical element to physical element as required. However, the different data storage areas are defined logically so that the data can be sent and retrieved to the individual storage areas.

Figure 4A:
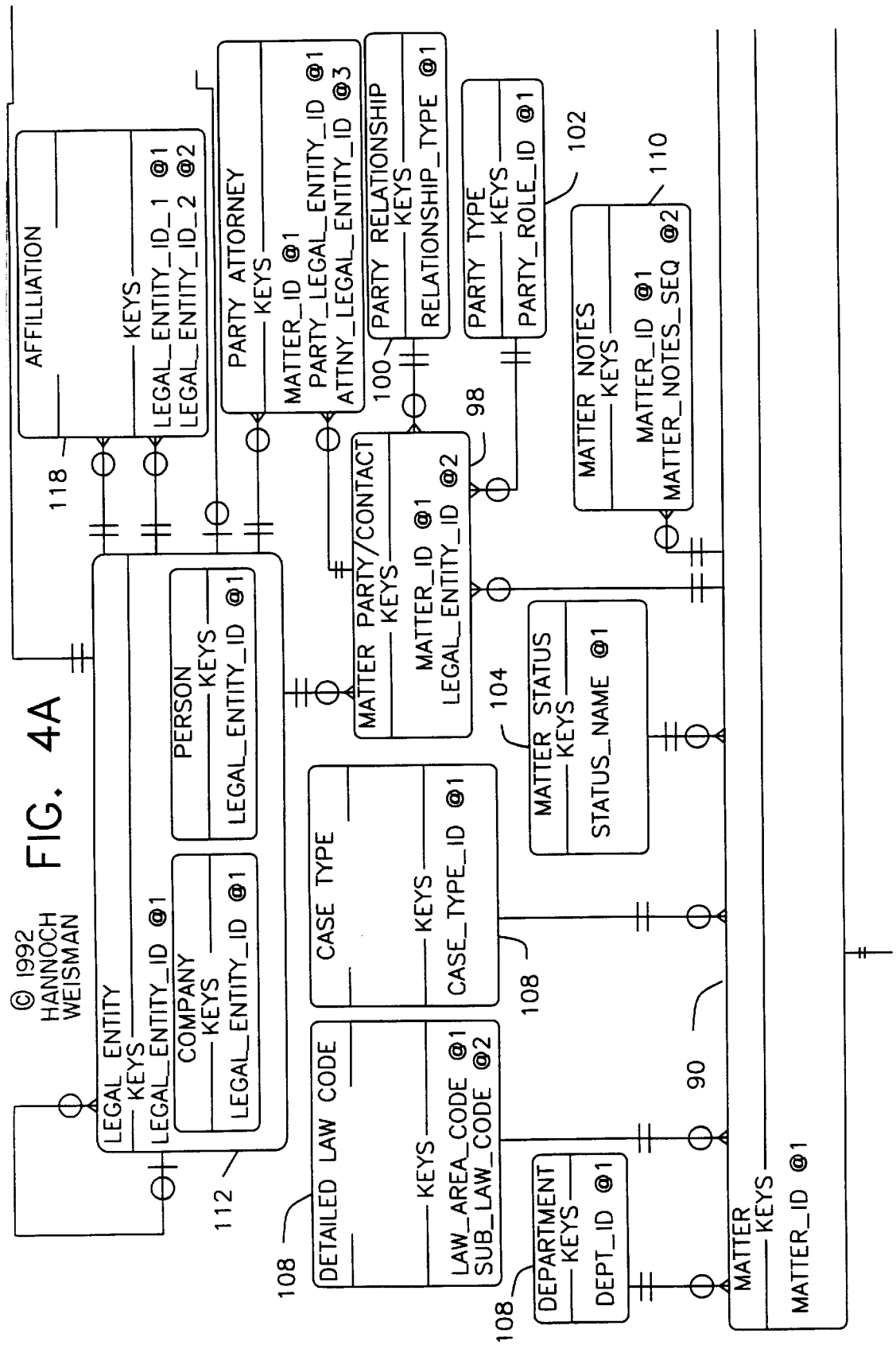
Figure 4B:
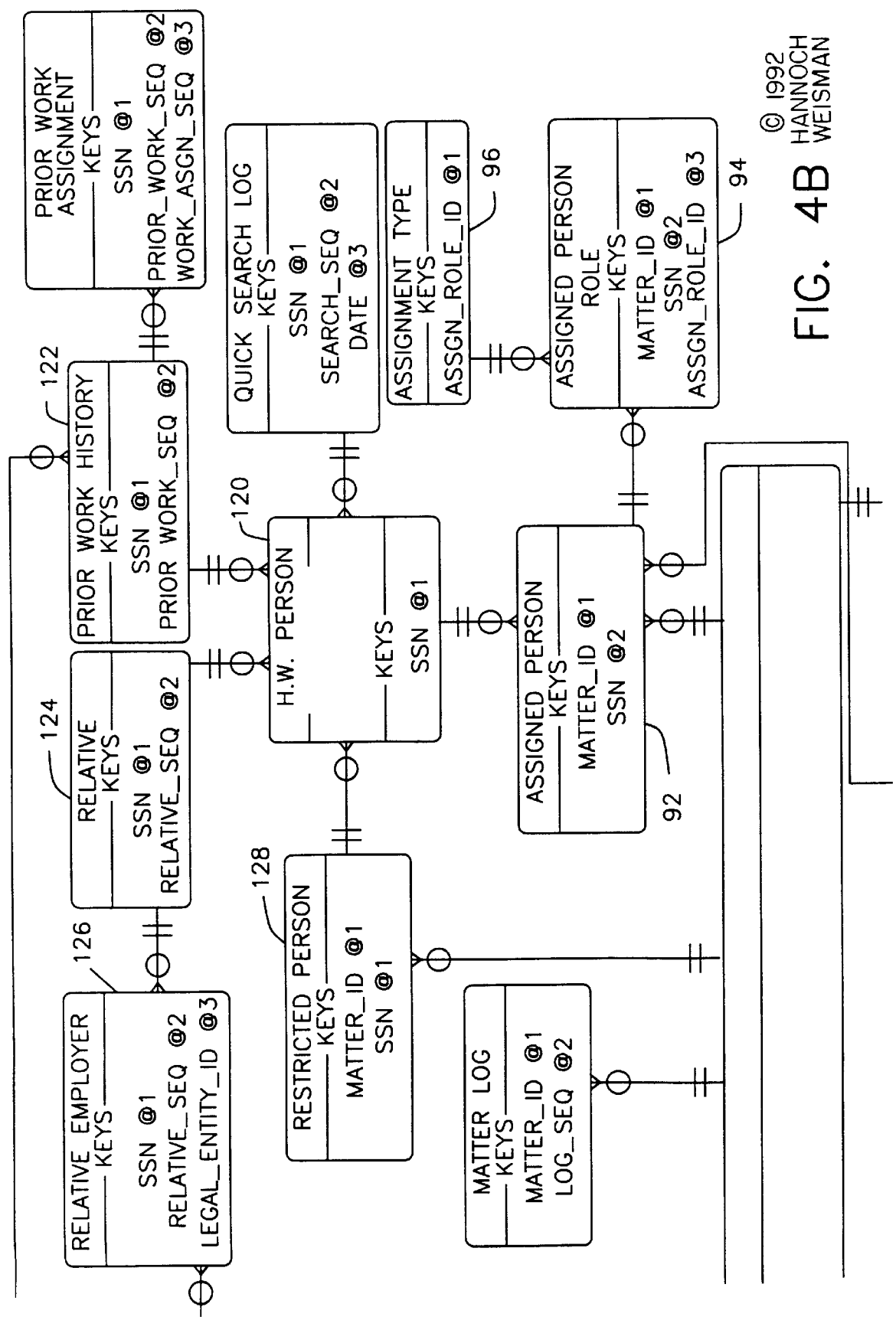
Figure 4D:
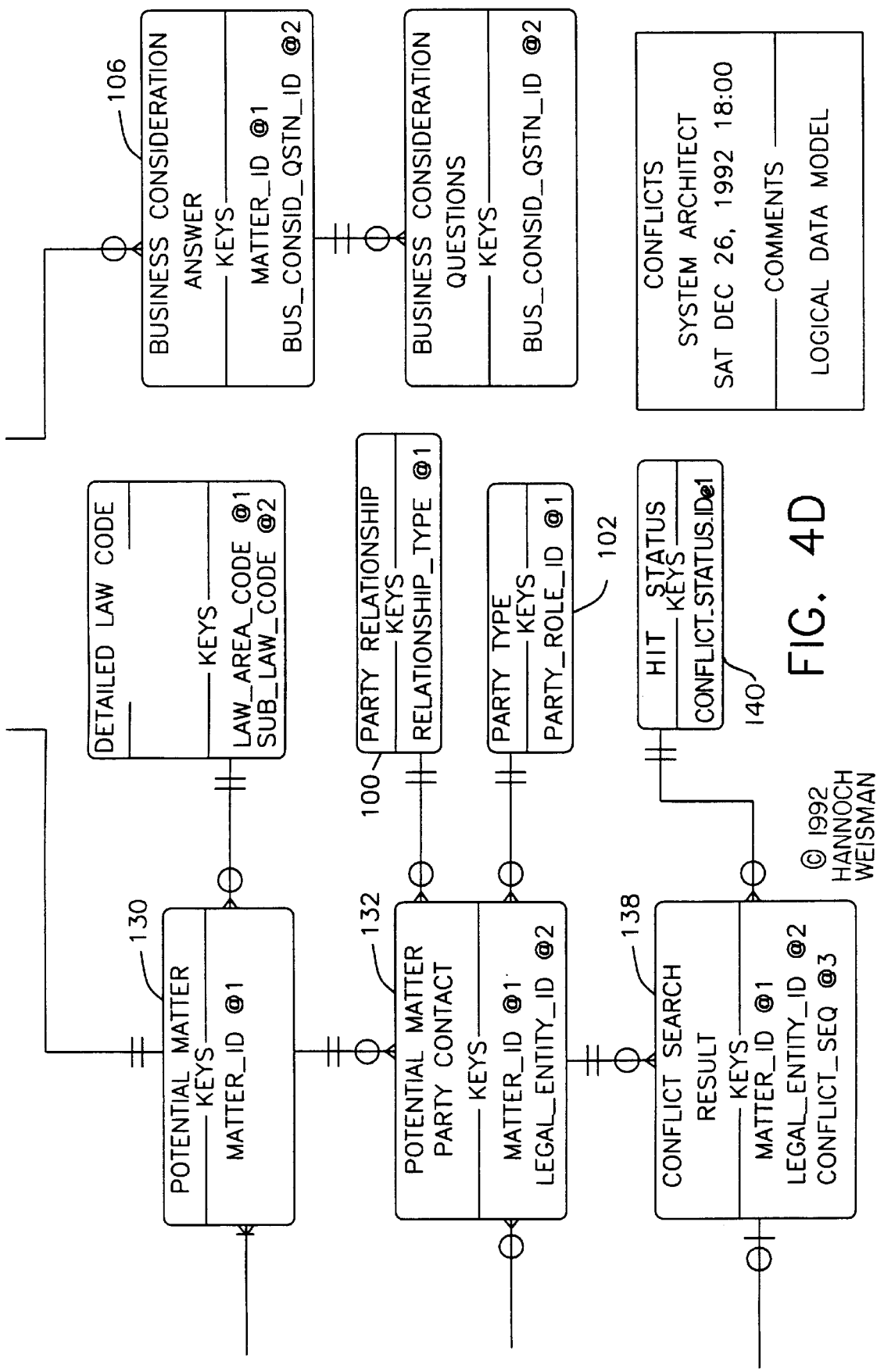

The data is stored in a database having a structure as illustrated generally in FIGS. 4a and 4b. Data relating to both existing matters and potential matters is kept in a central matter table 90 using a matter ID number as a key field. The unique value in the key field in turn identifies a record which stores several other items of information including social security numbers or "SSN" identifying various individuals assigned to the matter. Thus, one or more individual values of SSN may be stored in each record of table 90. The database further includes an assigned person table 92 having records identified by two key fields, the matter ID number and the SSN. Thus, a given record in matter table 90 may lead to one, or more than one, records in assigned person table 92. Each record in assigned person table 92 is uniquely identified by matter ID and SSN. Each record in assigned person table 92 also includes a value for assigned person row ID. A further table 94 has individual records with three searchable key fields, namely, matter ID; SSN; and assigned person row ID. Yet another table 96 has a single key data structure with a record for each type of row which an assigned person may have within the organization relative to a particular matter. In the data structure depicted in FIG. 4b, these individual entries include "billing", i.e., the attorney charge of billing the matter, "responsible", i.e., the attorney having overall professional responsibility for the matter and "other" meaning an attorney working on the matter. The relational data structure thus makes it possible to retrieve data relating to the role of persons assigned to a particular matter. For example, if supplied with the matter ID in master matter table 90, the system can locate a record for the matter and read the values of SSN. Using those values, the system can find the records in assigned person table 92 and thus find the assigned person role ID for each person. From the assigned person role ID, the system can retrieve the actual assignment type. For example, if the record for matter number 1001 includes SSNs 12345678 and 23456789. A query to table 90 using key field matter ID yields a record which contains SSN values 12345678 and 23456789. A query to table 92 using matter ID 1001 and SSN 12345678 finds a record which has as one field assigned person role ID 02. Query to assignment type key table 96 using assign person role ID "02" yields the key value "responsible". Thus, person 12345678 is identified cooperatively by the three tables as the responsible person for matter 1001.

Although the foregoing has been described in terms of the logical entries and the values associated with records, it should be appreciated that such logical notation is in itself shorthand for description of physical data elements stored in RAM 22 and data storage unit 24. Thus, the statement that master matter table 90 has individual records identified by a key field "matter ID" in fact means that, in response to a signal identifying a given sequence of data bits as denoting matter ID, the system will retrieve data stored in a particular area of RAM 22 or data storage 24, i.e., that there is a particular mapping between actual, physical storage locations and data bits identified as matter ID. Similarly, the statement that each record in master matter table 90 has "fields" including one or more entries for "SSN" means that the data stored in the particular physical locations denoted by the data entered as matter ID includes SSN. Thus, each record and field in the database structure defined herein corresponds, at any time, to particular physical elements within RAM 22 and data storage unit 24, although the particular correspondences may change from time to time as data is rewritten.

In similar fashion, each record within master matter table 90 also includes an entry denoting one or more legal entity IDs. Each legal entity ID is a number uniquely associated with a particular entity, which may be either a person or a company, outside of the organization. For example, the legal identity ID for a person outside of the organization may be a social security account number, whereas the legal entity ID for a company outside of the organization may be an employer identification number of the type utilized by the Internal Revenue Service. A matter party/contact table 98 having key fields matter ID and legal entity ID holds records, each specific to the relationship between a particular legal entity and a particular matter. Each record in matter party/contact table 98 includes fields for relationship type, party role and one or more additional legal entity ID numbers for attorneys of a party. Thus, in a manner similar to the assigned person table 92 discussed above, matter party contact table 98 coacts with master matter table 90 to provide a hierarchy of links which cooperatively denote the relationship between each party and the organization in relation to the particular matter. Stated another way, by querying the master matter table 90 and retrieving a particular legal entity denoted in a field of the record for that matter ID, the system can retrieve the two key fields for matter party contact table 98, which in turn leads to a unique record within that table. That record holds a relationship type. Using the relationship type number, the system can query the party relationship key table 100 and retrieve the meaning denoted by the relationship type. These possible meanings are as follows

| Short Meaning | Explanation |
|---|---|
| Client | A party is a client of the organization |
| CMPR | Concurrent multiple party representation - one of many parties represented by the firm in a single matter. |
| NCCP | Non-client co-party - a party which is involved in the matter on the same side as the firm's client but not a client of the firm. |
| Adverse | A party taking a position adverse to the firm's client or an affiliate of an adverse party. |
| Affiliate | A party not involved in the matter but affiliated with a client or CMPR party. |
| Affiliated NC | A party associated with an NCCP party. |

Similarly, matter party/contact table 98 leads to party type key table 102 setting forth descriptors for the role of a particular party as, for example, "plaintiff", "defendant", "claimant" or "creditor".

Each record in master matter table 90 further includes a status name, which in turn is the key field in a matter status lookup table 104. There are seven defined matter statuses: open; inactive; completed; closed; potential; rejected and administrative. An "administrative" matter is a matter not involving any client. A "potential" matter, also referred to herein as a "proposed" matter is a matter which has been proposed for work by the firm but not yet accepted or undertaken by the firm. A "rejected" matter is a matter which the firm has finally decided to reject. An "open" matter is a matter currently being acted upon by the firm whereas an "inactive" matter is a matter which has not been acted upon for a particular period of time but which is still the responsibility of the firm. A "completed" matter is one which is no longer the professional responsibility of the firm, but which may still have ongoing tasks such as collection of outstanding amounts owed to the firm. A "closed" matter is one which is no longer the professional responsibility of the firm and which has no ongoing collection or other tasks. Still further fields in each record of master matter table 90 include matter waiver ID and business consideration question identification. A waiver ID identifies a particular waiver of a potential conflict provided by a client, whereas business consideration question ID is used as a key field along with matter ID as a further key field to locate a unique record in a business consideration answers table. That is, for each question there is an answer for each matter stored in a business consideration consumer table 106. Other fields may also be included to denote elements such as codes for areas of law; code identifying department of the firm handling the matter and the type of case. These fields may be used with lookup tables 108 to retrieve necessary information pertaining to the matter. Likewise, a matter note sequence may also be stored in each record and used with matter note table 110 to retrieve textual information relating to the matter.

The database further includes a legal entity table 112 having as its key field legal entity ID. In the same manner as discussed with regard to matter table 90, legal entity table 112 includes records, each of which can be found by an inquiry based on legal entity ID. Each such record includes data used to work with the entity as, for example, the address and telephone number of the entity. An affiliation table 118 stores additional records, each of which is identified by the legal entity key fields for two parties. Each such record includes a legal entity field for another party affiliated with the first party, and further fields defining an affiliation role and conflict level for the relationship between the first and second parties. Thus, where a party is a general partnership, a second party may be a person or legal entity which is a general partner in the first party. The "affiliation role" would be stored as "Genpart" denoting general partner. The conflict level field includes a code denoting whether the particular relationship between the first and second parties is such that the second party should be considered along with the first in screening for legal or business conflicts. That is, for purposes of conflict screening, the relationships of the first party with the firm are attributed to the second party. For example, if the conflict level is set to "legal", then the relationships of a first party are attributed to the second party in determining whether or not a legally cognizable conflict of interest exist. Thus, if the first party—a general partnership—is a client of the firm, then the second party—the partner—is also treated as if he or she were a client of the firm in determining whether or not a proposed matter would or would not raise a conflict of interest. Likewise, if first and second parties are both general partners in the same general partnership, they are deemed affiliated with one another, and relationships of one are attributed to the other. Other affiliations denoted as a "business" level affiliation may have no bearing on whether or not a legally cognizable conflict of interest would occur, but may be something which the person evaluating any proposed matter concerning the parties involved may wish to consider. For example, if one corporation sells products to a legally unrelated second corporation, the second corporation may be considered as an "affiliate" of the first for business purposes.

A personnel data table 120 has the person identifier SSN as its key field. The individual user ID for each person is also noted in table 120. Each record in table 120 also includes a prior work sequence which can be combined together with SSN to uniquely identify a record in a prior work history table 122. Each record in the prior work history table in turn identifies a legal entity ID for a company for which the person previously worked. Each entry in the personnel table 120 may also include one or more fields denoting a relative sequence, which in turn can be used with SSN to identify a record in relative table 124. The relative table in turn links to a table 126 incorporating records keyed by SSN, relative sequence and the legal entity identification of the relative employer. Thus, from the SSN value for a particular individual the system can find the identities of his or her relatives and from that the legal entity identifications of their employers. The portions of RAM 22 and data storage unit 24 (FIG. 1) utilized to store personnel data table 120 and the related tables constitute the person data storage section 66 of the RAM and data storage units. A restricted person table 128 contains records with two fields, namely, matter ID and SSN; both are key searchable fields. Appearance of the SSN value for a particular person in an entry with the matter ID denoting a particular matter indicate that the person is restricted from access to any information pertaining to the particular matter.

The data structure further includes a potential matter table 130 essentially identical to master matter table 90 but containing data for potential matters. In practice, table 130 is implemented as that portion of the master matter table 90 containing data pertaining to matters with the matter status "potential". A potential matter party contact table 132 essentially identical to matter party contact table 98 is logically linked to potential matter table 130 in the same manner as table 98 is linked to table 90. The potential matter party table 132 in turn is linked to the party relationship table 100 and party type lookup table 102, as well as to the legal entity table 112. The depictions of tables 100, 102, 112 and 118 are repeated in FIGS. 4a and 4b for clarity of illustration. In practice however, only one physical copy of each of these tables is employed. Each record in potential matter table 130 includes an additional field for conflict request status, having entries found in a lookup table 134. The conflict request status denotes the status of the entire matter, i.e, either pending, clear or denied. Each record in the potential matter party contact table 132 includes, in addition to the fields discussed with respect to the matter party contact table 98, an additional field or fields denoting one or more conflict sequences. A conflict sequence is a variable which denotes a single possible interrelationship between a party associated with the potential matter and a party associated with an existing matter or another potential matter. Conflict search result table 138 includes matters uniquely identified by matter ID, legal entity ID for the party associated with the potential matter involved in the match and conflict sequence. For example, if a particular party associated with a single new matter generates matches with three legal entities associated with existing matters, there will be three unique conflict sequences stored in table 132. Each such conflict sequence, when used in conjunction with the matter ID and legal entity ID of the party in the proposed matter, leads to a single record in the conflict search result table 138. Each such record includes the legal entity identification for the company or person found and also includes a field for conflict status identification. The conflict status identification in turn serves as the key field in a conflict status lookup table 140, which contains entries defining the meaning of each conflict status. The defined conflict status are as follows:

| | |
|---|---|
| Pending | Newly identified conflict; no action yet taken by system. |
| Request For Attorney Evaluation Sent | The system has sent a signal to a particular requesting evaluation of the conflict. |
| OK | The evaluating attorney has indicated that there is no conflict in fact. |
| Request For Waiver Sent | The attorney indicates that the conflict is waivable with client consent and that he or she has sent a request to the client asking for such a waiver. |
| Waived | A waiver has been received from the client. |
| Unresolvable-Reject | Either the conflict is of a nature which cannot be waived or one of the involved parties has declined to grant a waiver. |

Each record in conflict search result table 138 also includes a field denoting the SSN of one or more persons, these individuals are thus identified as evaluators for the particular match. Additional fields are provided in each record of table 130 for the date reported to the evaluator, the date a response was received from the evaluator and the matter ID for the particular matter involved. The space within RAM 22 and data storage unit 24 occupied by the records in master matter table 90 constituting table 130 and the associated tables constitutes the proposed party storage region 64 (FIG. 1). A waiver table 144 has as its key field a unique waiver identification number denoting a particular waiver. Each record in this table includes the entity identifications of the party on whose behalf the waiver was obtained; the entity identification for the party which granted the waiver and, if different, the entity identification for the client involved in the matter which necessitated the waiver. Waiver table 144 also includes a waiver type identifier in each record; which in turn is keyed to a lookup table 146 giving the meanings of the various waiver types such as "blanket", i.e., pertaining to all potential conflicts between the obtaining and waiving parties or matters specific, limited to only the specific matter involved in the waiver. A matter waiver association table 148 is the correspondence between matter identifiers and waiver identifiers.

The data structure further includes a table of legal entity types (not shown) in which the key field is the type of legal entity as, for example, "close corporation"; "corporation"; "general partnership" and "individual". Each type of key field identifies a unique record. The other fields in the unique record specify affiliate types for the party type. For example, in the case of a close corporation expected affiliate roles would be "officer"; "director"; "shareholder"; "subsidiary"; "vendor"; "customer" and the like. Yet another table uses each type of affiliation as a key field and stores an appropriate question or set of questions to elicit the information needed to completely specify any affiliate of the particular type. For example, in the case of an affiliate role "officer", the set of questions may ask for the name, address and social security number of each officer, whereas in the case of an affiliate role "subsidiary" the set of questions may ask for the name, address, state of incorporation, employer identification number and standard industrial code or "SIC" of each subsidiary.

The data structure discussed above can be implemented using the ORACLE® database structuring system for translating human intelligible description of the data structure to machine-readable disk definition. As is well known to those skilled in the art, the ORACLE system utilizes a client/server architecture. The programming element 32 associated with the central processing unit defines those portions of the program associated with the ORACLE server, and those portions of the program are performed by central processor 20. The ORACLE server maintains the data tables in data storage unit and responds to queries from the client units. The programming elements 49 located at the terminals define those portions of the program associated with the ORACLE client, and those portions of the program are performed by the local processors 45 at the terminals 44. Thus, the portions of the program performed by the local processors provide the interface visible to the user. Also, the program portions performed by the local processors gain access to the information stored at the central unit by formulating ORACLE queries and sending such queries to the central processor 20. The central processor transmits responses to the terminals in the standard ORACLE query response format. Thus, in the particular embodiment described with reference to FIG. 1, the various signals sent by the local terminals are in the form of ORACLE queries, whereas the signals sent by the central processor are in the form of ORACLE query responses. Other known relational database management systems perform similar functions, and can be used instead of the ORACLE system.

A process according to one embodiment of the invention is implemented by actuating processor 20 using an applications program stored in the data elements 36 of programming element 32. The particular embodiment is described herein at the level of logical flow and, in some cases, individual "objects" used to implement the logic flow. Unless otherwise specified, the objects used in the preferred embodiment can be implemented under the Windows® graphical interface standard using the Power Builder® applications programming language for translation from high level, human intelligible language to object code of the type which can be interpreted directly by the processors. Other equivalent systems for performing this conversion can be employed. As will be appreciated by those skilled in the art of computer programming, each high level step is, in fact, directly translatable into particular electronic operations within processor 20, including retrieval of data from the various areas within RAM 22 and data storage unit 24. In effect, the high level description of the steps is a shorthand for the electronic operations. At the inception of the steps described below, the existing relationship data describing existing clients' affiliation and the other items for existing clients in data tables 90 through 128, is already stored in these data tables and hence present in existing parties data storage area 62 in the RAM and data storage units 22 and 24.

Processor 20 actuates network interface 40 and network 42 to establish bidirectional communications with all of terminals 44 which are then in operation. Processor 20 allows interaction between signals received from a terminal and the portions of the processor concerned with the present program only if the user of the terminal is identified as a proper user of the system, i.e., as a user whose log-in name and password match those stored as authorized users in network/phone memory region 68. The mechanics of user authorization may be incorporated into the network shell used to control the network or, alternatively or additionally, may be incorporated in the applications program. The processor, in conjunction with the network interface, maintains a data file containing a map relating user identification to physical location on the network and hence to a particular terminal. For example, if user 46b logs on to terminal 44b, physical terminal 44b is noted as the address for user 46b. The system actuates each terminal 44 associated with an authorized user to display a welcome or master screen, which allows the user to select a broad category of "matter intake" routine by pointing to an appropriate icon. Once matter intake is selected, the system displays a further screen with possible options. A first option leads to a new conflict search routine. If this option is selected, the system displays a conflict request screen at the user's terminal. This screen and the other screens described herein, desirably are constructed using standard features commonly found in Windows programming environments, such as on-screen push button boxes, check boxes, fill-in fields and drop down lists of available options. The new conflict request screen allows for entry of the requesting director, i.e., the attorney responsible for initiating the conflict request, and also allows for entry of the requesting person, i.e., the individual actually entering the request. Spaces are provided for entering the client name and other statistical data such as a description of the field of law and codes for the area of law. The conflict request screen also has a pull down field in which the user can select the role of the client in the matter. The client role must be one of the roles stored in party role table 102, i.e., plaintiff, defendant or other. The conflict request screen also has a field for entry of other parties in the matter and the role of each such party, as well as boxes to be checked if a particular party is an adverse party or a non-client co-party. Additionally, the conflict request screen also allows the user to select either a search for legal conflicts only or for business conflicts and legal conflicts together.

Figure 2A:
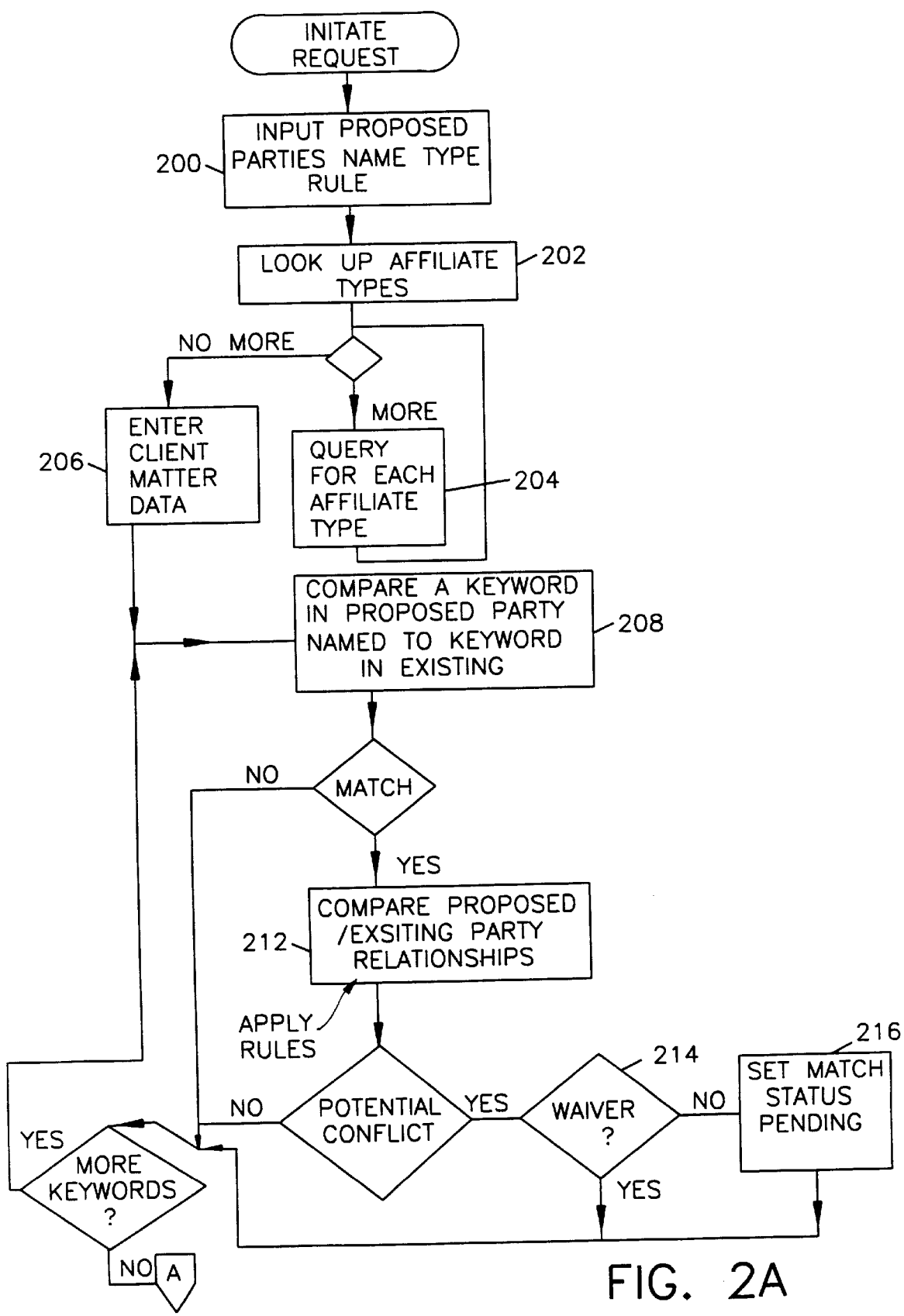
FIGS. 2a and 2b are flow charts illustrating parts of a process in accordance with one embodiment of the invention.

The user may enter either an existing client, i.e., a party stored in legal entity table 112, or a new client as the client in a potential matter. The conflict request screen is thus arranged so that when the user is finished entering the name of the client, the system will conduct a key word search through table 112, find the client or clients which match the word entered by the user and display these in a separate select client screen. Information such as the full name of the client, its address and telephone number are displayed. The user may then select one of the so-displayed clients or, if none of the so-displayed clients is the correct one, the user may initiate creation of a new client. If the user selects entry of a new client, the system displays a screen having as its first field the entity type field. This allows the user to select from the valid entity types (e.g., "corporation;" "close corporation") stored in the data tables. After selecting a valid entity type, the user is prompted to enter information about the client itself, such as its name, address, contact persons and the like. Once the user has performed these steps, he or she has completed the first stage of the process, namely input of the proposed client's name, entity type and role (step 200, FIG. 2a).

In the next step 202, processor 20 retrieves the affiliate types appropriate to the entity type for the proposed client from the database. Processor 20 retrieves the queries appropriate to each affiliate type from the data base and actuates the particular terminal 44 associated with the requesting person to display these queries. For example, where a party is entered as a general partnership, process 20 will retrieve "general partner" as one of several affiliate types. Using that affiliate type, process 20 will retrieve a query consisting of questions asking for the identity and entity type of each general partner (step 204). This process is repeated until the appropriate queries have been displayed, and answers answered, for all of the expected affiliate types found in step 202. Each query must be answered either with data specifying affiliates or with an affirmative statement that there are no affiliates of such type. Similarly, parties other than clients can only be entered if they are already found in entity table 112. If not, the system requires entry of data concerning the party in the same manner as for a client, and requires entry of affiliate data for the party in the same way. The additional parties are also structured in entity table 112. At the same time, the processor actuates the requester's terminal to display a list of preselected questions about the potential matter. The answer to each such question is entered in a field of the matter record in the potential matter section 130 of matter table 90. The preselected questions are specified by the firm dependent upon the nature of its practice. For example, a law firm which represents insurance carriers in negligence matters normally does not wish to represent claimants in negligence matters, even if the matters are unrelated and pose no legal conflict of interest. Thus, such a firm may establish a preselected question as "is this a plaintiffs negligence case?".

Once the data pertaining to the new matter, and to the proposed new client and other parties, if any, has been entered in this manner, the processor holds the matter for review by preassigned new matter checkers, such as clerical staff in a central new business department or files department. The checkers have access to the system through certain terminals 44. The processor presents the data to the particular terminals used by the new matter checkers. When a checker has reviewed the data associated with a particular new matter, he or she signals the system to that effect, whereupon the system assigns a matter identification number to the new potential matter and fills in entries in tables 130 and 132. (Step 200) Again, although table 130 is shown separately for ease of understanding, it should be appreciated that table 130 is part of master matter table 90, and consists of those matters having matter status "potential". If a matter involves a new legal entity either as a potential client, as an affiliate of the potential client or as another party in the matter, such as an adverse party or a co-party, the system enters the data provided about the party in the legal entity table 112. Also, where an affiliation between entities was provided during the data entry phase, as where one party was entered as an affiliate of another, the affiliation is denoted by an entry in affiliation table 118. At the same time, the system sends a message to the terminal of the person who originated the conflict request indicating that the matter has been entered as a potential new matter and giving the newly assigned matter number and client number. The new matter checkers help to prevent entry of spurious data into the system. Their function can be omitted, and the system can be arranged to assign the new matter number immediately in response to data supplied by the person requesting the conflict check.

At this stage, each potential matter is symbolized by one entry in the potential matter table 130 section of table 90. Such entry includes a conflict request status for the potential matter as a whole. There will also be one or more entries in potential matter party contact table 132, each symbolizing a party associated with the potential matter which at this stage would be "unchecked". Each entry in potential matter party contact table 132 includes a party relationship, such as client, concurrent multiple party, representation party, non-client co-party, adverse party, affiliated with a party or affiliated with a non-client party, as well as a party type such as plaintiff, claimant, defendant, etc. as set forth in lookup tables 100 and 102. The requesting person may also enter a textual comment about the matter.

In a separate routing (not shown) an attorney in a firm may also enter a party as a "prospect". Entry of a prospect is performed substantially the same as entry of a party for a proposed matter, except that there is no potential matter associated with the party. Instead, a one-character field in the record for the party in entity table 112 is set to indicate that the party is a "prospect". A party can be entered as a prospect by an attorney who believes that the party may request work from the firm in the future.

In the next stage, process 0–20 executes a comparison routine for each party involved in the new matter, i.e., for each entry in table 132 for the particular matter. Thus, the system compares (step 208) the key words in the name of a potential matter party to other key words in the names of parties recorded in entity table 112. Inasmuch as entity table 112 contains the names of all existing parties and affiliates of existing parties, and also contains the names of all parties involved in potential matters currently being screened as well as their affiliates, this step compares the data representing the potential parties with the data representing the existing parties, and other potential parties. The system selects key words from each party name, thus disregarding "noise" words such as "inc", "company" and the like. The system sets a match between a party involved with the potential matter being checked and an existing matter party or a party to another potential if one or more key words match. In the discussion below, the routines for handling matches between a potential matter party and an existing matter party are described. The same routines are applied to any matches found with parties in other potential matters.

Various matching standards can be used to decide whether or not a match has been found. Typically, a match does not require full character-by-character matching of all key words in the names being compared. The matching standard can be set to yield a match if any one key word has all matching characters; if any one key word has the first five characters matching; or if two or more key words have more than some percentage of their characters matching and so on.

Once a match is found between a potential matter party and another party, the system retrieves the party relationship and party type data for both parties involved in the match. The system then compares the party relationship type data (step 212) for the two parties and determines whether or not a potential conflict exists by applying rules embodied in a truth table. A portion of the truth table is set forth below.

| Party Relationship in Potential Matter | Party Relationship in Other Matter (Existing or Potential) | Potential Conflict |
| --- | --- | --- |
| Client | Client | No |
| Client | Adverse | Yes |
| Adverse | Adverse | No |
| Concurrent Multiple Party Rep. | Client | No |
| NCCP | Client | Yes |
| NCCP | Adverse | No |

If this potential conflict pretesting step yields the result that there is no potential conflict, the match is disregarded and the key word screening continues. If the potential conflict pretesting step indicates that a potential conflict does exist, the process branches to a waiver checking step 214. In this step, the system uses the legal entity ID for both parties involved in the potential conflict to retrieve waiver identifications from entity table 112. The waiver IDs so retrieved are then used to query waiver table 144. Each waiver is examined to see if it is a blanket waiver and, if so, whether the blanket waiver applies to all conflicts with the other party involved in the potential conflict being checked or if it applies to all parties in which the role relationship matches the role relationship in the potential conflicts being checked If a blanket waiver covering the potential conflict is found, a entry is made in matter waiver table 148 with the matter ID of the potential matter and the waiver ID for the appropriate blanket waiver recording that the waiver was applied, and the potential conflict is then disregarded. However, if no appropriate blanket waiver was found, the system branches to step 216, in which an entry is made to conflict search result table 138 for the particular match or "hit" being processed. Such entry includes the matter ID; the legal entity ID for the potential matter party and a conflict sequence or serial number denoting the potential conflict as the first, second, third and so recorded for the particular matter ID and legal entity ID. The entry at this point is recorded with a status "pending". At this point also, the conflict request status in the potential matter table 130 section at table 90 is set to "awaiting evaluation".

The process of setting a match, and writing entries to the conflict search result is matter-specific. That is, if a comparison between the potential matter party and the other parties in legal entity table 112 leads to another party having numerous matters recorded in matter party contact table 98, the system will treat each such matter separately and will check the relationship for the other party separately with respect to each such match. Thus, where the other party found occupies different roles in different matters, some of its matters may result in a potential conflict when the rules of truth table step 212 are applied, whereas other matters may not. Each matter which does yield a potential conflict in step 212 will result in a separate entry in conflict search result table 138.

The process continues through the key word search until all party names for the potential matter parties listed in potential matter party contact table 132 has been checked against all other party names in entity table 112. Affiliates of the potential matter parties are then retrieved using affiliation table 118 and screened against the other parties recorded in legal entity table 112 in exactly the same manner, using steps 208 through 216. In this process, each affiliated party is treated as having the relationship of the potential matter party with which it is affiliated. For example, an affiliate of a potential matter party who is the client in the potential matter will be treated as an affiliate of a client. The same affiliated party, if affiliated with a potential matter party who is expected to be an adverse party would be treated as an adverse party for purposes of comparing potential and existing party relationships (step 212). The algorithm used for these stages is shown below:

```
FOR EACH Matter Party (Clients and other parties)
    FOR EACH Keyword
        Search for Matching Keywords and the matching party
        Evaluate the potential party role and the matching party role
        If potential conflict, Create a hit w/status pending
            See if there are any waivers available
    END FOR
    FOR EACH Affiliation
        FOR EACH Keyword
            Search for Matching Keywords and the matching party
            Evaluate the potential party role and the matching party role
            If potential conflict, Create a hit w/status pending
                See if there are any waivers available
        END FOR
    END FOR
END FOR
```

During the keyword search and testing steps, parties which are flagged as "prospects" in legal entity table 112 are treated as having the relationship of "prospect" to the firm. If any adverse party in the proposed matter matches any party in legal entity table 112 having the status of "prospect", such a match is not treated as creating a legal conflict, but instead is treated as creating a business consideration. The processor writes an entry into business consideration table 106 with the matter identification and a consideration sequence as key fields, and with the legal entity identification of the involved "prospect" entity.

Figure 2B:
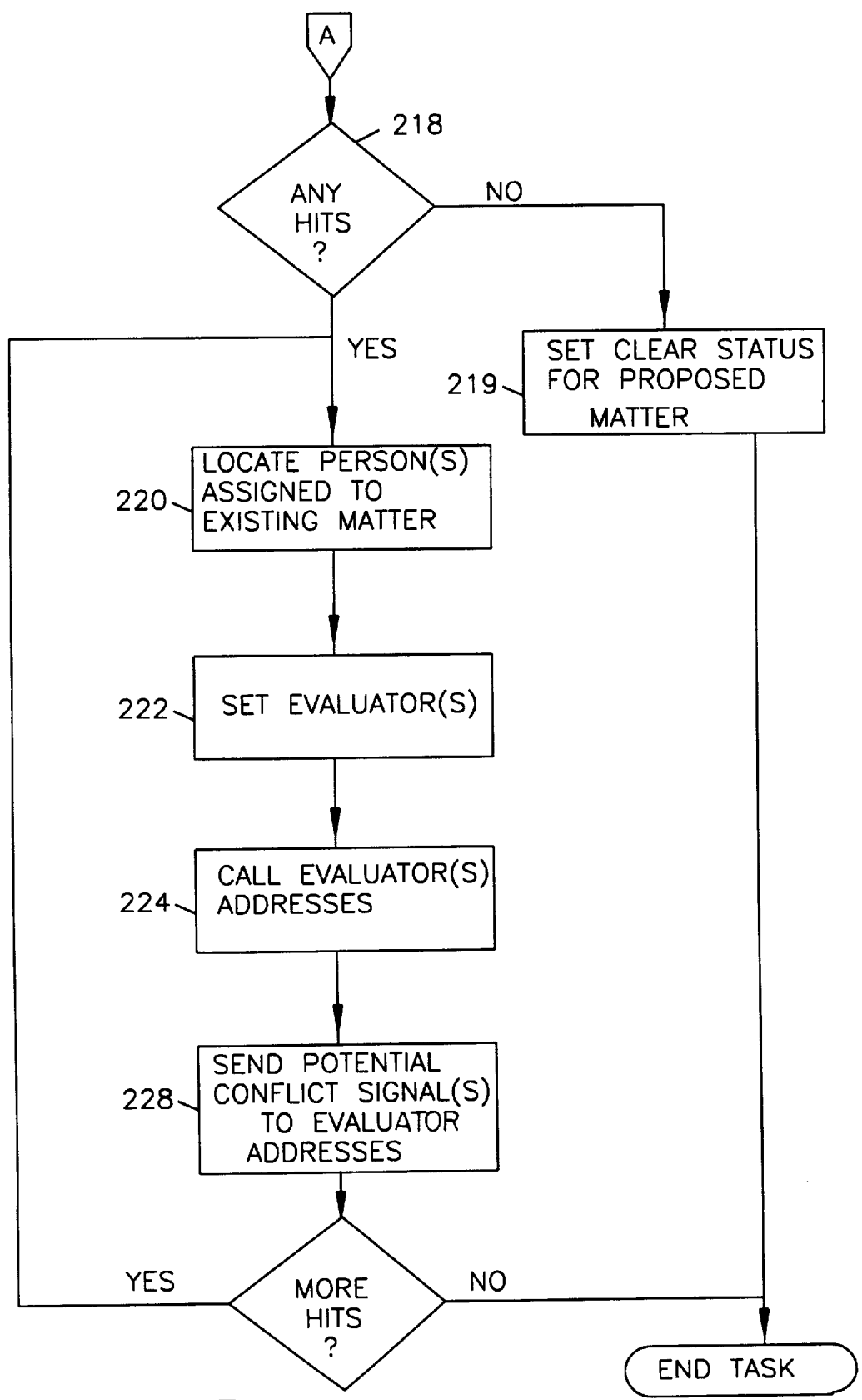

If the process continues through the complete keyword search for all potential matter parties and all affiliates of potential matter parties, it reaches determination step 218. If, at this stage, the conflict request status for the potential matter as a whole has not been set to "pending", then it is set to "clear", (step 219) indicating that no potential conflicts were found or, if any were found, the same are already waived. However, if a potential conflict was found and the conflict request status was set to pending, the system performs a problem signaling routine (FIG. 2b). For each potential conflict in table 138 for the matter, the system retrieves the matter identification for the existing matter involved in the conflict and, using that matter identification, queries matter table 90 to find the SSN for the persons assigned to the existing matter (step 220). The system also queries assigned person table 92 and assigned person role table 94 to locate the person assigned to the found existing matter as responsible director, i.e., the individual responsible for conduct of the existing matter. The system thus identifies such a person as the evaluator for the particular conflict represented by the particular hit. The system then enters the evaluator in the record within conflict search report table 138 pertaining to the particular potential conflict. There may be different evaluators for different potential conflicts involving a particular existing party, such as where an existing party has multiple matters and hence multiple attorneys responsible for its affairs.

In the next stage 224, the system uses the associations between the identities of individual persons (as denoted by SSN) and terminal addresses denoted in the data stored in network/phone directory region 68. As noted above, this association will depend upon the particular terminal where the person is logged onto the system at the time. In the next stage 226, the system sends a potential conflict signal to the evaluator by dispatching such signal to the terminal associated with the evaluator. Whenever any match in conflict search result table 138 lists a particular individual as an evaluator, an alarm signal is sent to the terminal associated with that person. The local program executed by each terminal reacts to the alarm signal by causing the terminal to emit an audible beep or other sound, and also actuates the terminal to display a flashing icon on the terminal screen, indicating that there are conflict search results for the particular individual to evaluate. The evaluator can respond to the alarm signal by "double clicking" the icon or entering an appropriate series of keystrokes causing the local terminal 44 to call processor 20 to supply a list of potential matters which produced conflict for evaluation by the person.

When the processor 20 sends the alarm signal to an evaluator for a particular conflict, it updates the hit status field in conflict search result 138 for the particular potential conflict from "pending" to "request for attorney evaluation sent". If the alarm signal has been set, and the alarm status has already been set at the terminal for a particular evaluator, so that the conflict waiting status is set at the evaluator's terminal, the alarm signal may be omitted or else may be ignored by the evaluating terminal but the additional conflict is added to the conflict list for such evaluator.

When the evaluator actuates his or her terminal to respond to the alarm status flashing icon, as by double clicking the icon, the terminal displays selected information from the pending conflict list for the evaluator. Thus, the evaluator's first screen displays only a list of the potential maters awaiting evaluation by that particular evaluator, the name of the requesting person and the number of potential conflicts or matches to be evaluated for that particular potential matter. If the evaluator selects a particular potential matter, as by double clicking it, the terminal brings up more detailed information from the conflict request list for that evaluator, i.e., further detail from conflict search result table 138. In addition to the name of the potential matter, the client in the potential matter and the role of the client in such potential matter, the more detailed information displayed at this stage includes the name of the existing party and existing matter for which a potential conflict was found, the status of each existing party in the existing matter and the status of the particular conflict. At this stage, the evaluator may enter a textual comment with respect to the particular potential conflict, and/or read any other textual comments entered by the requesting person.

Figure 3:
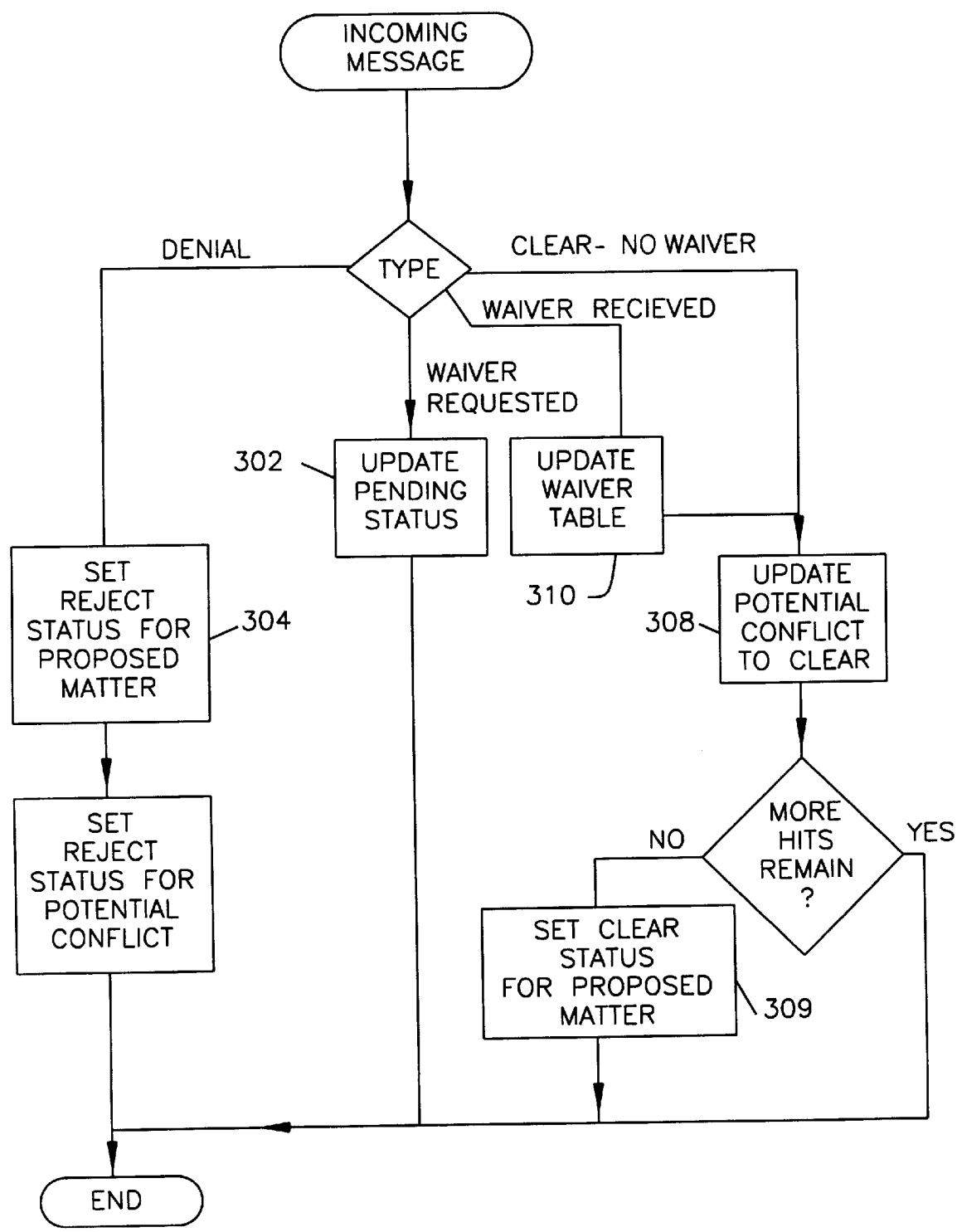
FIG. 3 is a flow chart illustrating a further portion of the process illustrated in FIGS. 2a and 2b.

The evaluator may also act on the potential conflict by entering a signal through his or her terminal. If the evaluator believes that the matter can be cleared by a waiver from the existing client involved in the potential conflict, he or she may send a conflict request to the potential client using a conventional word processing program, and may enter an update signal through the terminal by selecting the potential conflict and changing the displayed status from "request for evaluation sent" to "waiver requested". The signal is sent back through the data communications network 42 and interface 40 to processor 20. As shown in FIG. 3, the processor reacts to such an update signal by altering the record in conflict search result table 138 to update the status to "request for waiver sent", (step 302) the processor also incorporates the time of the last updating in the record.

If the evaluator believes that the conflict is unresolvable he or she may send a denial signal by clicking a "reject" button on his or her screen. In response to a denial signal, processor 20 changes the status of the entering matter in table 130 directly from "request for evaluation sent" to "reject" (step 304). The processor also updates the record in conflict search result table 138 for the particular potential conflict to "unresolvable-reject".

The evaluator may, alternatively, find that the potential conflict is in fact no conflict. For example, where the key word search results in a finding that a potentially adverse party in the potential matter is the same as an existing client of the firm, the evaluator may recognize that the client names, although similar, are not the same. Alternatively, the evaluator may further investigate the actual legal relationship between the client and the firm, or the potential matter party and the firm, and find that the relationships do not, in fact, pose a legal problem. In either case, the evaluator changes the status of the potential conflict on his or her screen, whereupon the terminal dispatches a clearance message to processor 20. The processor updates the status of the particular conflict in conflict search result 138 to clear (step 308). The processor then determines whether or not any other potential conflicts exist for the same potential matter which are still not in clear status. If all potential conflicts are in clear status, the processor updates the status entry in potential matter table 130 for the entire potential matter to clear status (step 309).

Where the evaluator has requested a waiver from the client, and such a waiver is received, the evaluator calls up the potential conflict on his terminal and makes a waiver received entry for the particular potential conflict. The terminal then displays a further screen calling for details of the waiver, i.e., whether the waiver is a blanket waiver for all other potential conflicts between the same two parties or whether the waiver pertains only to the particular matter. Upon entry of this information, the terminal then sends back a waiver received signal which includes both the clearance signal and the data pertaining to the waiver. The processor updates waiver table 144, matter waiver table 148 and the entries in legal entity table 112 to reflect the newly received waiver (step 310) and then proceeds to the clearance updating routine (step 308 and 309). Of course, if the evaluator receives a response from the party concerned that a waiver will not be granted, the evaluator can enter a rejection in the manner described above. Thus, as the evaluators for the individual potential conflicts associated with a potential matter complete their evaluations, the processor automatically updates the status of the potential matter.

Any attorney may, at any time, call up the status of those matters for which he or she has requested clearance, i.e., the matters for which he or she is the requesting person. The requester does this by clicking an appropriate icon on his or her terminal, whereupon processor 20 recognizes the particular requester based upon his or her log-in identification and the address data stored in the network/phone address information section (68, FIG. 1). The processor then queries the potential matter section 130 of matter table 90 to select all potential matters for which the particular individual is the requester. The processor sends a listing of those particular matters, and their status to the requester's terminal where the same are displayed. Preferably, the matters are displayed in two separate lists; one for matters awaiting evaluation, i.e., those for which the potential matter conflict status is "pending" or "request for evaluation sent" and a separate list for other matters which are either in "cleared" or "denied" status. The cleared or denied matters can be acted upon by the requesting person, whereas the pending matters cannot. The cleared and denied matters desirably are color coded to indicate the particular status.

By selecting any matter and double clicking it on his or her terminal, the requester can cause the terminal to send an inquiry signal to processor 20, which in turn queries conflict search result table 138 to retrieve a list of all evaluators for a particular potential matter. The processor also retrieves the statuses of all potential conflicts for this potential matter assigned to each evaluator. The processor then provides a list of all evaluators together with an indication of status to the requester's terminal. Desirably, the status is shown at this stage as a box, which is checked if all potential conflicts assigned to this particular evaluator are in a clear status, and which is unchecked if any potential conflicts assigned to the particular evaluator are not in clear status. Thus, because the indication of the status of each pending matter, including the identities of each evaluator who has not yet completed his or her evaluation, is accessible through the network, the requesting person can determine the cause of any delay in clearance with respect to his or her matters and contact the responsible individual directly. The system may also include a supervisory routine to determine whether any matter has been in a "pending" or "request for evaluation sent" status for a period of time above a predetermined threshold. In this routine, the system provides an indication of such matters to a system supervisor. The system supervisor may be given authority to assign such a matter to a new evaluator, as by making appropriate entries in the conflict search result table 138.

By selecting any potential matter and indicating rejection by double-clicking on a "reject" button on the terminal screen, the requester can send a final rejection signal to the processor. At this point, the processor actuates the requester's terminal to display a reject matter screen. The reject matter screen offers a choice of entries for the reason why the matter was rejected as, for example, "conflicted out"; "client refusal"; "firm refusal"; or "other". Typically, if the potential matter is in "denied" status, indicating that the firm cannot properly represent the client in the potential matter, then the matter would be indicated as "conflicted out" in the reject-matter routine. However, the matter may be dropped for other reasons as, for example, if the potential client withdraws his request for service during the evaluation process. The reject matter routine also provides for entry of textual remarks concerning the potential matter and the reasons for rejection. Information is also requested as to whether proprietary information of the potential client was learned during the clearance process as, for example, where the attorney who initially interviewed the client learned confidential matters. This is indicated by a "yes" or "no" answer. The requester is then prompted to indicate whether or not the potential client should or should not be considered for future business relationships with the firm. Upon entry of this information, the processor changes the status of the potential matter in matter table 90 from "potential" to "rejected" and deletes all entries for the potential matter from conflict search result table 138. The answers provided to the question of whether or not confidential information was learned from the client is entered as a one byte yes or no indicator in a one byte field in the entry for the matter in matter table 90. The information as to whether future business with the client should be considered is also stored in a separate field in the same record. The confidential information field is used along with the party relationship type data in future conflict screening operations. Thus, if a party was a potential "client" of the firm as to a particular matter, and the confidential information field indicates that confidential information was received, then the client would be treated in the same manner as if he or she were an active client of the firm for such matter during future conflict screens, and could provoke a potential conflict during the party relationship testing stage (step 212, FIG. 2a). However, if the confidential information field indicates that no confidential information was learned, then the party relationship test treats the potential client in the rejected matter as not a client of the firm and will not provoke potential conflicts with the rejected client and matter.

If the requester wishes to open the matter, he or she can select any pending matter and indicate a request to open the matter by double clicking an "open" button on his or her matter review screen. This sends an open-matter signal to processor 20. If the conflict request status of the potential matter is not yet "cleared" when the requester indicates that the matter should be opened in this manner, then the indication will have no effect. However, if the conflict request status for the matter is "cleared" and an open matter signal is received, then the conflict request status will be changed from "cleared" to "ready for business evaluation", indicating that the conflict request clearance has been accomplished and that the matter is now ready for consideration by the firm intake committee or business evaluators.

At this time, the processor selects a business consideration evaluator for the matter according to preselected rules. For example, where the firm has numerous departments and the requesting person belongs to a particular department, the business consideration evaluator may be the head of such department. Alternatively, the business consideration evaluator may be the chairman of the firm's new business committee or the like. The processor writes the matter ID into a list of matters awaiting action by the selected business consideration evaluator. When the so selected individual indicates that he or she is ready to evaluate matters, as by sending a signal from his or her terminal, the processor displays a list of matters awaiting evaluation. Once the evaluator has selected a particular matter, the processor sends a signal including the answers to the preselected questions concerning business considerations which were entered by the requester. Typically, the answer to each such question is expanded in text form. The evaluation signal also includes the identities of all legal entities identified as potentially conflicting prospects in business consideration table 106 for the potential matter. Where the client in the potential matter is an existing or past client of the firm, the processor desirably also retrieves information from the firm's accounting database and displays client financial information such as payment history and any present balance owed by the client. The business consideration evaluator then sends a business consideration accept or reject signal for the matter to processor 20 from his or her terminal 44. If the signal is a "reject" signal, then the processor performs the reject matter routine discussed above, and queries the business consideration evaluator, through his or her terminal, as to the reasons for rejection. However, if the business consideration evaluator indicates that the matter should be accepted, then the processor changes the conflict request status in table 130 to "ready to open" and writes an entry indicating the matter number into a table of files awaiting opening. The processor may then signal appropriate clerical personnel to perform tasks required to create physical files associated with the matter and to enter further data concerning the matter.

Upon entry of such further data and a signal indicating that the appropriate clerical tasks have been performed, the status of the matter is changed in table 90 from "potential" to "open" and all entries concerning the matter are deleted from conflict search result table 138. However, if the additional data entered at this stage includes any additional affiliations or parties, the conflict search request routine is repeated. If any potential conflicts are isolated, the status of the matter is again set to "potential" and the process proceeds as discussed above. During the course of the matter, additional parties may be proposed to be added or a party's affiliations may change. In either case, the conflict search routine is repeated once again.

The system can also send and receive signals automatically from persons in the organization through phone interface 58 and telephones 60. Thus, new matters and parties, as well as evaluations, can be entered by a person at a telephone. Additionally, a relay operator 61 at the local I/O terminal 38 or at a distributed terminal 44, can communicate by telephone with other persons for assisted data entry.

In the system as described above, each potential conflict is sent to only one evaluator for evaluation. Stated another way, the set of evaluators for any given potential conflict includes only one evaluator and the system sets a clear status for such potential conflict upon receipt of a clear signal from that one evaluator. However, the set of evaluators for a potential conflict may include several evaluators as, for example, the responsible attorney and the billing attorney for the potentially conflicting matter. In this arrangement, the system may be arranged to set the clear status upon receipt of a clear signal from any one of the evaluators. Alternatively, the system may be arranged to require clearance by all of the evaluators, or by some set including less than all of the evaluators for the potential conflict before setting the clear signal. The system may be arranged to set a unresolvable or reject status for a particular potential conflict upon receipt of a clearance denial signal from any one evaluator in a set of plural evaluators. Likewise, the set of business consideration evaluators for a particular potential matter may include more than one evaluator, and the system may be set to require acceptance by all in order to accept the matter, or to allow acceptance upon receipt of accept signals from some particular combination of evaluators. For example, if there are two junior evaluators and one senior evaluator, the system may be arranged to accept the matter upon receipt of an accept signal from the senior evaluator alone, or from both junior evaluators without the senior evaluator, but not to accept the matter upon receipt of an accept signal from only one junior evaluator.

In a further variant of the system, potential business conflicts can be treated in exactly the same manner as potential legal conflicts. Thus, where prospects are associated with particular responsible persons, a potential conflict signal can be sent to each such person upon occurrence of a potential conflict involving a prospect in exactly the same manner as a potential conflict involving a party and the system can be arranged to deny conflict clearance until the responsible person for each such prospect has assented.

As these and other variations and combinations of the features described above can be utilized without departing from the present invention as defined by the claims, the foregoing description of the preferred embodiments should be taken by way of illustration rather than by way of limitation of the invention as defined by the claims.

What is claimed is:

1. A method of operating a computer system to check and clear relationship problems in an organization including a plurality of persons, comprising the steps of:

(a) providing computer-intelligible existing relationship data denoting one or more existing parties having existing relationships to the organization and an association between each said existing party and one or more persons within the organization;

(b) providing computer-intelligible potential relationship data denoting one or more potential matters and one or more potential parties associated with each said potential matter;

(c) actuating a computer system to compare the potential relationship data and the existing relationship data and identify a potential matter as having a match when a potential party associated with a potential matter matches an existing party;

(d) for at least some of said matches, performing a problem signaling routine in said computer system including the steps of (i) setting a potential problem status in said computer system for the potential matter having the match; (ii) using said associations demonstrated by said data, automatically selecting one or more persons associated with each existing party included in the match as evaluators for such potential problem status; and (iii) automatically sending a potential problem signal incorporating information about the match to the evaluators; and (e) receiving problem clearance signals sent by said evaluators and automatically clearing potential problem statuses responsive to said problem clearance signals.

2. A method as claimed in claim 1 wherein said computer system is connected to a data transmission network, at least some of said persons having terminals connected to the network, said steps of sending and receiving said problem clearance signals being performed by sending said potential problem signals and said problem clearance signal via said network.

3. A method as claimed in claim 2 wherein said step of clearing potential problem statuses includes the step of clearing each such status promptly upon receipt of said problem clearance signals from a preselected set of said evaluators for such status.

4. A method as claimed in claim 3 further comprising the step of automatically setting a clear status with respect to each potential matter either promptly after said comparing step and said step of performing a problem signaling routine, if no potential problem status has been set with respect to said potential matter, or, if one or more potential problem statuses have been set for such potential matter, promptly after clearance of the last remaining potential problem status for such potential matter.

5. A method as claimed in claim 4 further comprising the step of receiving clearance denial signals sent by said evaluators and setting a clearance denied status for a potential matter in response to receipt of clearance denial signals from a preselected set of evaluators for a potential problem status associated with such matter.

6. A method as claimed in claim 5 wherein, in said step of providing potential matter data, a requesting person within the organization associated with each said potential matter supplies said potential matter data through said network.

7. A method as claimed in claim 5 wherein, in said step of providing potential matter data, a requesting person within the organization associated with each said potential matter supplies said potential matter data, the method further including the step of automatically providing an indication of each said clear status and each said denied status accessible through said network.

8. A method as claimed in claim 7 further comprising the step of automatically providing an indication of pending status accessible through said network for each potential matter for which a potential problem status has been set but not cleared, and for which no denied status has been set.

9. A method as claimed in claim 1 wherein said existing relationship data includes party-to-matter association data denoting one or more existing parties as involved in one or more existing matters and person role data denoting one or more persons within the organization as responsible for each existing matter, said step of automatically selecting one or more persons including the steps of selecting one or more existing matters for each existing party included in the match using said party to matter association data and, for each so-selected existing matter, selecting the person or persons responsible for such existing matter in accordance with said person role data.

10. A method as claimed in claim 1 wherein said existing relationship data and said potential relationship data include data defining one or more relationships of each existing and each potential party, the method further comprising the step of pretesting each said match by applying one or more testing rules to yield a potential problem result or a no potential problem result based upon the relationships for the existing and potential party involved in the match, said step of performing said problem signaling routine being performed for a match only if the testing step yields said potential problem result for the match.

11. A method as claimed in claim 10 wherein said existing relationship data includes existing party relationship type data categorizing each existing party in one or more categories of existing relationship to the organization and wherein said proposed relationship data includes potential relationship type data categorizing each potential party in one or more categories of potential relationship to the organization, said testing step including the step of comparing the party relationship type data for the existing and potential parties involved in a match.

12. A method as claimed in claim 11 wherein said categories of potential relationship are the same as said categories of existing relationship.

13. A method as claimed in claim 1 wherein said potential relationship data includes affiliation data denoting affiliated parties and an association of each said affiliated party with one or more of said potential parties, said step of comparing the potential relationship data with the existing relationship data including the step of identifying a proposed matter as having a match when one of said affiliated parties matches one of said existing parties.

14. A programming element for a computer system comprising a data storage medium and program data on said data storage medium for actuating a computer system to perform a method as claimed in claim 1 or claim 4 or claim 13.

15. A method as claimed in claim 1 wherein said step of actuating said computer system to identify an existing party and a potential party as matching one another when data designating the potential party and data designating the existing party correspond with one another to at least a preselected degree of correspondence.

16. A method as claimed in claim 1 wherein said preselected degree of correspondence is less than full correspondence of all elements of the data designating said potential and existing parties.

17. A method as claimed in claim 1 further comprising the step of providing party type data in said computer system defining a plurality of party types and a set of affiliation types for at least some of said party types, each such set of affiliation types including one or more affiliation types, said step of providing said potential relationship data including the steps of entering a party type to said computer system for each potential party, and, if a set of affiliation types is defined for such party type and automatically displaying queries requesting the identities of affiliates in each type included in the set.

18. A method as claimed in claim 1 further comprising the steps of actuating said computer system to execute a matter opening routine to establish a potential matter as an existing matter and automatically inhibiting said matter opening routine with respect to a potential matter if a potential problem status has been set for such potential matter and has not been cleared.

19. A method as claimed in claim 18 wherein said matter opening routine includes the step of automatically incorporating potential party data associated with the matter being opened into said existing party data.

20. A method of operating a computer system to check and clear relationship problems in an organization including a plurality of persons, at least some of whom are connected to a data transmission network, the method comprising the steps of:

(a) providing computer-intelligible existing relationship data denoting one or more existing parties having existing relationships to the organization and an association between each said existing party and one or more persons within the organization;

(b) providing computer-intelligible potential relationship data denoting one or more potential matters and one or more potential parties associated with each said potential matter;

(c) actuating a computer system to compare the potential relationship data and the existing relationship data and identify a potential matter as having a match when a potential party associated with a potential matter matches an existing party;

(d) for at least some of said matches, performing a problem signaling routine in said computer system including the steps of (i) setting a potential problem status in said computer system for the potential matter having the match; (ii) using said associations demonstrated by said data, automatically selecting one or more persons associated with each existing party included in the match as evaluators for such potential problem status; and (iii) automatically sending a potential problem signal through said network incorporating information about the match to the evaluators; and (e) receiving problem clearance signals and clearance denial signals sent by said evaluators through said network and automatically either clearing each potential problem status responsive to problem clearance signals or setting a clearance denied status responsive to said clearance denial signals, wherein, in said step of providing potential matter data, a requesting person within the organization associated with each said potential matter supplies said potential matter data through said network, the method further comprising the step of automatically providing an indication of pending status accessible through said network to the requesting person associated with such potential matter for each potential matter for which a potential problem status has been set but not cleared, and for which no clearance denied status has been set, such indication including an indication of the identity of the evaluator or evaluators for each potential problem status which has been set but not yet cleared for such potential matter.

21. A method as claimed in claim 20 wherein said indication of pending status includes information as to each evaluator stating whether all potential conflicts associated with the potential matter and assigned to that evaluator have been cleared.

22. A method of operating a computer system to check and clear relationship problems in an organization including a plurality of persons, comprising the steps of:

(a) providing computer-intelligible existing relationship data denoting one or more existing parties having existing relationships to the organization and an association between each said existing party and one or more persons within the organization;

(b) providing computer-intelligible potential relationship data denoting one or more potential matters and one or more potential parties associated with each said potential matter;

(c) actuating a computer system to compare the potential relationship data and the existing relationship data and identify a potential matter as having a match when a potential party associated with a potential matter matches an existing party;

(d) for at least some of said matches, performing a problem signaling routine in said computer system including the steps of (i) setting a potential problem status in said computer system for the potential matter having the match; (ii) using said associations demonstrated by said data, automatically selecting one or more persons associated with each existing party included in the match as evaluators for such potential problem status; and (iii) automatically sending a potential problem signal incorporating information about the match to the evaluators;

(e) receiving problem clearance signals sent by said evaluators and automatically clearing potential problem statuses responsive to said problem clearance signals; and (f) actuating said computer system to execute a matter opening routine to establish a potential matter as an existing matter and to (i) present data representing policy attributes pertaining to each potential matter to a predetermined set of policy attribute evaluators (ii) receive policy attribute clearance signals from said policy attribute evaluators; and (ii) inhibit said matter opening routine until policy attribute clearance signals have been received from a preselected set of said policy attribute evaluators.

23. A method as claimed in claim 22 wherein said step of providing said proposed relationship data includes the steps of entering data representing said policy attributes for each said proposed relationship.

24. A method as claimed in claim 22 wherein said data representing policy attributes includes data pertaining to prior financial transactions between the organization and a potential party in the potential matter, whereby the policy evaluators can evaluate the credit worthiness of the potential party.

25. A computer system for checking and clearing relationship problems in an organization including a plurality of persons at a plurality of distributed locations comprising:

(a) a plurality of terminals disposed at said locations;

(b) a data communications network connected to said terminals;

(c) existing-relationship memory means for storing computer-intelligible existing relationship data denoting one or more existing parties having existing relationships to the organization and an association between each said existing party and one or more persons within the organization;

(d) potential-relationship memory means for storing computer-intelligible potential relationship data denoting one or more potential matters and one or more potential parties associated with each said potential matter;

(e) processor means connected to said memory means for comparing the potential relationship data and the existing relationship data, identifying a potential matter as having a match when a potential party associated with a potential matter matches an existing party; and, for at least some of said matches, performing a problem signaling routine including the steps of (i) setting a potential problem status for the potential matter having the match; (ii) using said person association data, automatically selecting one or more persons associated with each existing party included in the match as evaluators for such potential problem status; and (iii) sending a potential problem signal incorporating information about the potential problem status through said data communications network and terminals to the evaluators.

26. Apparatus as claimed in claim 25 wherein said processor means includes means for receiving problem clearance signals sent by said evaluators through said data communications network and automatically clearing potential problem statuses responsive to said problem clearance signals.

27. Apparatus as claimed in claim 26 further comprising address storage means for storing addresses for persons, each such address denoting one said terminal associated with each person, and wherein said processor means includes means for actuating said data communications network to deliver each potential problem signal to only those terminals associated with the evaluators for the potential problem.

28. Apparatus as claimed in claim 27 further comprising means for displaying an audio or video signal at said terminals to indicate the arrival of a potential problem signal.

* * * * *

UNITED STATES PATENT AND TRADEMARK OFFICE
CERTIFICATE OF CORRECTION

PATENT NO. : 5,774,866
DATED : June 30, 1998
INVENTOR(S) : Horwitz, et. al.

It is certified that error appears in the above-identified patent and that said Letters Patent is hereby corrected as shown below:

Column 29, line 37, "(ii)" should read --(iii)--.

Signed and Sealed this

Twenty-second Day of September, 1998

BRUCE LEHMAN

Attest:

Attesting Officer

Commissioner of Patents and Trademarks